(12) United States Patent
Vitucci

(10) Patent No.: US 12,378,847 B2
(45) Date of Patent: Aug. 5, 2025

(54) MOBILE OFFSHORE CARBON CAPTURE AND SEQUESTRATION SYSTEMS AND METHODS USING FLOATING STRUCTURE

(71) Applicant: VTEC CONSULTING LLC, Houston, TX (US)

(72) Inventor: John M. Vitucci, Houston, TX (US)

(73) Assignee: VTEC Consulting LLC, Houston, TX (US)

( * ) Notice: Subject to any disclaimer, the term of this patent is extended or adjusted under 35 U.S.C. 154(b) by 0 days.

(21) Appl. No.: 18/780,676

(22) Filed: Jul. 23, 2024

(65) Prior Publication Data
US 2025/0198259 A1    Jun. 19, 2025

Related U.S. Application Data

(60) Provisional application No. 63/610,529, filed on Dec. 15, 2023.

(51) Int. Cl.
*B63B 35/44* (2006.01)
*E21B 41/00* (2006.01)

(52) U.S. Cl.
CPC .......... *E21B 41/0064* (2013.01); *B63B 35/44* (2013.01); *E21B 41/0007* (2013.01)

(58) Field of Classification Search
None
See application file for complete search history.

(56) References Cited

U.S. PATENT DOCUMENTS

| | | | |
|---|---|---|---|
| 9,751,039 B2 | 9/2017 | Gebald et al. | |
| 10,232,305 B2 | 3/2019 | Gebald et al. | |
| 10,279,306 B2 | 5/2019 | Gebald et al. | |
| 10,427,086 B2 | 10/2019 | Gebald et al. | |
| 10,807,042 B2 | 10/2020 | Bijl et al. | |
| 11,007,470 B2 | 5/2021 | Wurzbacher et al. | |
| 11,045,758 B2 | 6/2021 | Peng | |
| 11,285,425 B2 | 3/2022 | Sauerbeck et al. | |
| 11,414,962 B2 * | 8/2022 | MacDougall | B09B 3/40 |

(Continued)

FOREIGN PATENT DOCUMENTS

| | | |
|---|---|---|
| DE | 102010026711 A1 | 10/2011 |
| DK | 202000220 A1 | 12/2021 |

(Continued)

OTHER PUBLICATIONS

"AN9003—A User's Guide to Intrinsic Safety", retrieved from the Internet Jul. 12, 2017.

(Continued)

*Primary Examiner* — Nicole Coy
*Assistant Examiner* — Douglas S Wood
(74) *Attorney, Agent, or Firm* — Jeffrey L. Wordt; THE WENDT FIRM, P.C.

(57) ABSTRACT

Systems and methods for mobile offshore carbon capture and sequestration operations. One system includes a first floating offshore installation featuring a direct air capture (DAC) unit, carbon dioxide dehydration unit, CO2 compression unit, and transfer system, and a second floating offshore installation featuring carbon dioxide injection facilities to inject carbon dioxide into an underground reservoir. In other systems and methods, a subsea system is substituted for the second floating offshore installation.

17 Claims, 14 Drawing Sheets

(56) References Cited

U.S. PATENT DOCUMENTS

| | | | |
|---|---|---|---|
| 11,420,149 B2 | 8/2022 | Gebald et al. | |
| 11,612,879 B2 | 3/2023 | Gebald et al. | |
| 11,629,577 B2 | 4/2023 | Dockter | |
| 11,712,652 B2 | 11/2023 | Spiteri et al. | |
| 2003/0168864 A1* | 9/2003 | Heronemus | B63B 35/44 |
| | | | 290/55 |
| 2008/0202921 A1* | 8/2008 | Wilkinson | C25B 1/04 |
| | | | 204/247 |
| 2010/0107957 A1* | 5/2010 | Van Loenhout | B63B 21/50 |
| | | | 114/230.2 |
| 2011/0171107 A1 | 7/2011 | Britten | |
| 2015/0004084 A1 | 1/2015 | Goldberg | |
| 2015/0121869 A1 | 5/2015 | McAlister | |
| 2015/0315879 A1 | 11/2015 | Williams | |
| 2017/0204704 A1 | 7/2017 | Sommerfield | |
| 2017/0283014 A1 | 10/2017 | Baker | |
| 2018/0119676 A1 | 5/2018 | Maini | |
| 2018/0161719 A1 | 6/2018 | Peng | |
| 2019/0011565 A1* | 1/2019 | Embry | G01S 17/42 |
| 2019/0264655 A1 | 8/2019 | Maini | |
| 2020/0398947 A1 | 12/2020 | Hulsey | |
| 2021/0054701 A1* | 2/2021 | Holck | E21B 44/10 |
| 2021/0275960 A1* | 9/2021 | Peng | B01D 53/1412 |
| 2022/0241727 A1 | 8/2022 | Dehlsen | |
| 2022/0268129 A1* | 8/2022 | Dockter | E21B 41/0064 |
| 2023/0009233 A1* | 1/2023 | Lopez | B65G 5/00 |
| 2023/0103018 A1 | 3/2023 | Holck | |
| 2023/0191322 A1 | 6/2023 | Shors et al. | |
| 2023/0233985 A1 | 7/2023 | Vargas et al. | |
| 2023/0256377 A1 | 8/2023 | Gebald et al. | |
| 2023/0313988 A1* | 10/2023 | Løseth | E21B 41/0064 |
| 2024/0058742 A1* | 2/2024 | Dunn | B01D 53/261 |
| 2024/0060397 A1 | 2/2024 | Tsuji et al. | |
| 2024/0068742 A1* | 2/2024 | Vijayan | G06V 20/52 |

FOREIGN PATENT DOCUMENTS

| | | |
|---|---|---|
| WO | WO2010149953 A2 | 12/2010 |
| WO | WO2019032646 A1 | 2/2019 |
| WO | WO2021151443 A1 | 8/2021 |
| WO | WO2022149515 A1 | 7/2022 |
| WO | WO2023194765 A1 | 10/2023 |

OTHER PUBLICATIONS

WIPO, International Search Report for PCT/US2024/059582, pp. 1-5, Apr. 2, 2025.

WIPO, Written Opinion of the ISA for PCT/US2024/059582, pp. 1-9, Apr. 2, 2025.

* cited by examiner

MOBILE OFFSHORE CARBON CAPTURE AND SEQUESTRATION SYSTEMS AND METHODS USING FLOATING STRUCTURE

CROSS-REFERENCE TO RELATED APPLICATIONS

This application is entitled to and claims the benefit of earlier filed provisional application No. 63/610,529 under 35 U.S.C. § 119 (e) and may be related to earlier filed provisional application No. 63/610,525, both filed Dec. 15, 2023, which earlier filed provisional applications are expressly incorporated by reference herein in their entireties.

BACKGROUND INFORMATION

Technical Field

The present disclosure relates to systems and processes of using same in the marine (offshore) field. In particular, the present disclosure relates to systems and processes useful for performing carbon capture and sequestration operations employing a floating structure.

Background Art

The Paris Agreement is a legally binding international treaty on climate change. Adopted by 196 Parties at the UN Climate Change Conference (COP21) in Paris, France in December 2015 and put into action beginning November 2016. Its overarching goal is to hold the increase in the global average temperature to well below 2° C. above pre-industrial levels and pursue efforts to limit the temperature increase to 1.5° C. above pre-industrial levels. In recent years, world leaders have stressed the need to limit global warming to 1.5° C. by the end of this century. Emissions need to be reduced 45% by 2030 and reach net zero by 2050 to keep global warming to no more than 1.5° C.

Recent modeling indicates emissions reduction plus removal of existing carbon dioxide ($CO_2$) in the atmosphere is required. Carbon removal technologies such as Direct Air Capture (DAC) and Storage/Sequestration (DACS) are key towards achieving this goal.

The United States government has announced that DAC is a component of its overall strategy to reduce CO2. In order for DAC to remove CO2 from the atmosphere in large quantities, suitable geological CO2 storage must be available. Thousands of wells located in the United States Gulf of Mexico (GoM) in both state and federal waters, can store various capacities of CO2 and are logical candidates for storage/sequestration. Some estimate that 80% to 90% will need to be plugged and abandoned in the next 10 to 20 years. Plug & Abandonment (P&A) of legacy wells is costly to operators. Benefits of using existing wells for large-scale CO2 storage include the fact that reservoirs and wells are characterized with good historical records available. Reservoir pressures are low due to long term production, reducing injection pressure build-up-associated risks. Infrastructure is in place.

A typical offshore drilling or production program employing jack-up structures are limited to water depths up to 500 feet. What would be an advance in the art of carbon capture (or CO2 capture) is a floating mobile offshore unit that includes a modular DAC unit that can be moved into position near enough to a deepwater floating production structure or subsea system so that transfer conduits may be used to transfer fluids therebetween, for example, transferring CO2 from the floating mobile offshore unit to the floating production structure, or into a subsea tree or manifold, for injection of the CO2 into a reservoir, and transferring natural gas from the floating production structure or subsea system to the floating mobile offshore unit for use as fuel gas.

What would be a further advance in the carbon capture art is a floating mobile offshore unit that uses either a conventional semi-submersible hull form or a ship-shape hull, either a one-deck configuration or a multiple deck configuration with one or more open decks and one or more enclosed decks; that house carbon capture systems, renewable energy systems, conventional power generation, compression, and offloading systems; that includes a design that is indifferent to the carbon capture technology selected; and that can optionally be outfitted with accommodations for manned operations, but that may also be operated in a fully automated and non-manned facility.

Various efforts in this area may be exemplified by U.S. Pat. Nos. 11,629,577B2; 11,414,962B2; and U.S. Published patents application nos. 20170283014A1; 20190264655A1; 20180119676A1; 20200398947A1; 20110171107A1; 20230191322A1; 20230009233A1; 2015004084A1; 20230103018A1; 2021275960A1; 2022241727A1; 20220268129A1; and DK 202000220A1; WO2010149953A2; WO2021151443A1; and WO2023194765A1. However, none of these documents disclose systems and processes as taught by the present disclosure.

As may be seen, current practice may not be adequate for all circumstances. There remains a need for safe, more robust, mobile offshore carbon capture and sequestration systems and processes. The systems and methods of the present disclosure are directed to these needs.

SUMMARY

In accordance with the present disclosure, mobile offshore carbon capture and sequestration unit (MOCCASU) systems and processes are described which reduce or overcome many of the faults of previously known systems and processes.

A first aspect of the disclosure are mobile offshore carbon capture and sequestration systems, comprising:
 a) a mobile first offshore installation comprising
  i) a floatable hull, and
  ii) a CO2 removal system comprising one or more CO2 removal units on or in the floatable hull, and one or more compressors, the one or more CO2 removal units configured to remove CO2 from atmospheric air through Direct Air Capture (DAC) and form captured CO2;
 b) one or more transfer conduits fluidly connecting the CO2 removal system and compressors with a floating second offshore installation (or in alternative embodiments, a subsea system);
 c) the one or more compressors configured to transfer the captured CO2 through the one or more transfer conduits to the second offshore installation or the subsea system;
 d) the second offshore installation (or the subsea system) comprising one or more CO2 injection wells configured to inject the captured CO2 into a subsurface storage formation selected from a depleted oil/gas reservoir, a saline aquifer, or other rock strata.

A second aspect of the disclosure are methods, comprising:

a) providing a mobile first offshore installation comprising a floatable hull and one or more CO2 removal units on or in the floatable hull;
b) removing CO2 from atmospheric air through Direct Air Capture (DAC), forming captured CO2;
c) pressurizing the captured CO2 to a pressure P1 sufficient to transfer the captured CO2 through one or more transfer conduits to a floating second offshore installation (or a subsea system);
d) transferring the captured CO2 through the one or more transfer conduits to the second offshore installation (or the subsea system), where the captured CO2 has a pressure P2, where P2<P1;
e) where pressure P2 is sufficient to transfer the captured CO2 through one or more CO2 wells into a subsurface storage formation selected from a depleted oil/gas reservoir, a saline aquifer, or other rock strata.

These and other features of the systems and methods of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain systems and methods may be devoid of a transfer buoy. As another example, certain systems and methods may be devoid of a second installation except for a subsea production system, as explained more fully herein. It will also be understood that the term "CO2" refers to carbon dioxide, CO2.

BRIEF DESCRIPTION OF THE DRAWINGS

The manner in which the objectives of this disclosure and other desirable characteristics can be obtained is explained in the following description and attached drawings in which:

It is to be noted, however, that the appended drawings of FIGS. 1-10 are not to scale and illustrate only typical system embodiments of this disclosure. Furthermore, FIGS. 11-14 illustrate only four of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
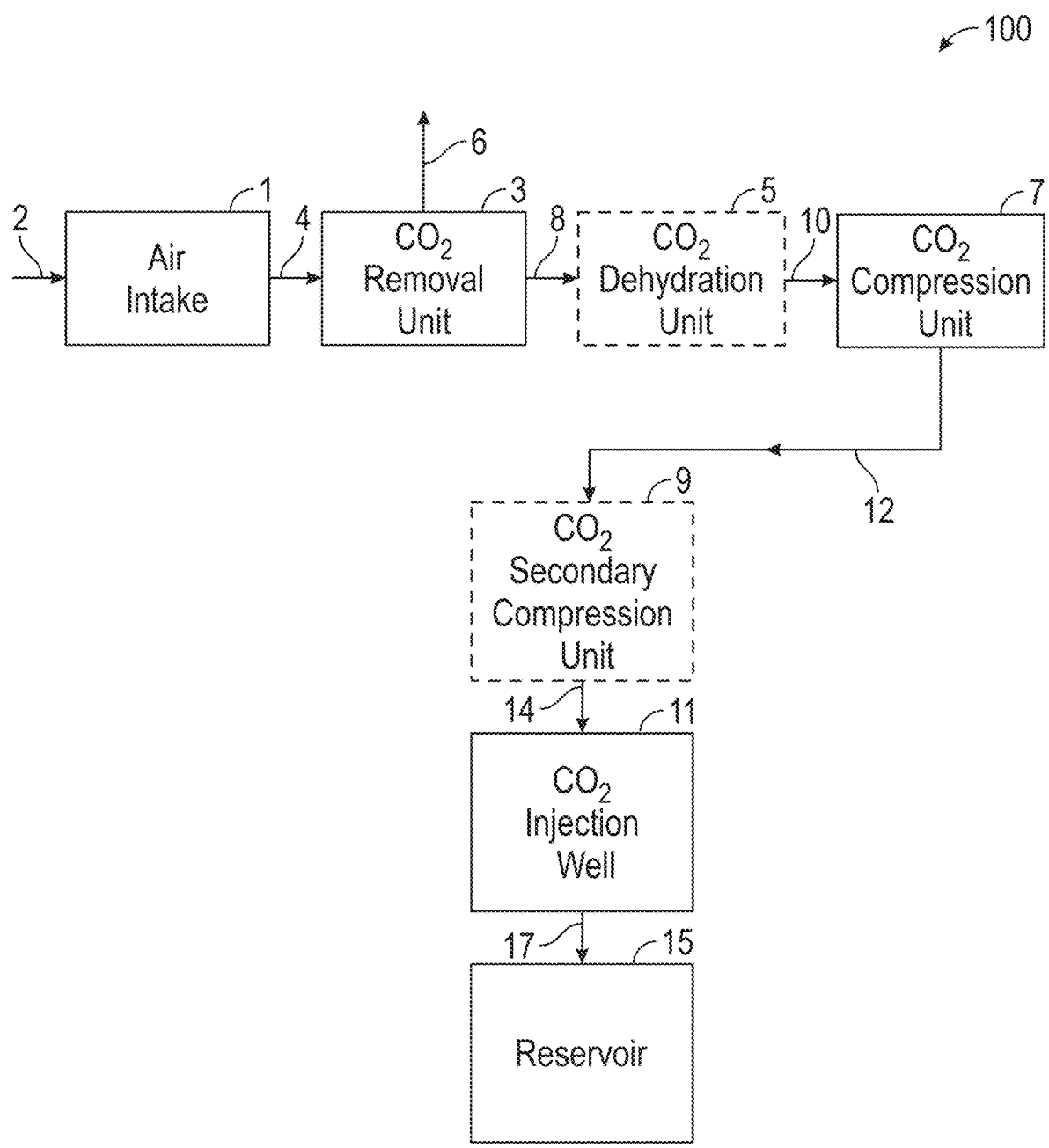
FIG. 1 is a high-level schematic illustrating one MOC-CASU system and method embodiment in accordance with the present disclosure.

In the following description, numerous details are set forth to provide an understanding of the disclosed apparatus, combinations, and processes. However, it will be understood by those skilled in the art that the apparatus, systems, and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein.

As mentioned earlier herein, typical offshore drilling and production programs employing jack-up structures are limited to water depths up to 500 feet. What would be an advance in the art is a floating mobile offshore unit that includes a modular DAC unit that can be moved into position near enough to a floating production structure or subsea system so that transfer conduits may be used to transfer fluids therebetween, for example, transferring CO2 from the floating mobile offshore unit to the floating production structure or a subsea production system for injection of the CO2 into a storage reservoir, and transferring natural gas from the floating production structure or subsea production system to the floating mobile offshore unit for use as fuel gas. What would be a further advance in the art would be a floating mobile offshore unit that uses either a conventional semi-submersible hull form or a ship-shape hull, either a one-deck configuration or a multiple deck configuration with one or more open decks and one or more enclosed decks; that houses carbon capture systems, renewable energy systems, conventional power generation, compression, and offloading systems; that includes a design that is indifferent to the carbon capture technology selected; and that can optionally be outfitted with accommodations for manned operations, but may also be operated in a fully automated and non-manned facility. The systems and methods of the present disclosure are directed to these needs.

As described in more detail herein with reference to the various drawing figures, systems and methods (processes) of the present disclosure are comprised of two main components, the first being an installation including a mobile offshore structure that can be operated and maneuvered to the desired offshore location in greater than 500 feet water depth, and having DAC components. The first installation may include one or more CO2 compressors. The location of the first installation relative to the second installation (or a subsea production system) is determined based on the desired application for the system. Factors such as watch zone designations, transfer conduit configuration and routing, subsea equipment, subsea flowlines and pipelines, and mooring lines, and prevailing met ocean conditions among others, can impact the placement of the first installation.

The second main component of systems and methods of the present disclosure is either a floating installation including a deck and one or more surface production wells and wellheads, and one or more surface CO2 injection wells and wellheads, or, in embodiments where there is no second installation per se, a subsea production system with subsea trees and wellheads as described herein.

Transfer conduits fluidly connect the first and second installations, in some embodiments employing a transfer buoy between the first and second installations. The transfer conduits may be line pipe in certain embodiments, for CO2 and fuel gas (natural gas, NG) transfer, with CO2 being transferred from the first installation to the second installation, and the fuel gas being transferred from the second installation to the first installation. The first and second installation transfer systems as well as the transfer conduits may comprise a combination of: one or more pressure and/or flow control devices, such as valves (for example riser ball valves); one or more flow measurement devices (also referred to herein as mass flow meters or mass flow sensors); and in certain embodiments one or more accessory equipment such as one or more connectors, one or more isolation valves, one or more pressure relief devices, among others. The specific configuration of the first and second installations defines the capabilities of each system and method embodiment. Redundancy and/or modularity of components allows for extended service periods and mitigates risk of downtime due to component failure. An example would be a CO2 compressor failing, or a CO2 removal unit plugging. In this case, isolating the failed component and enabling another one allows for continued operations, and enables evaluation and/or modification of the operational parameters to minimize the risk of failure of the new component in use.

Advantageously, most of the components of systems and processes of the present disclosure may be sourced from existing pieces of equipment used in the oil and gas drilling industry or conventional drilling; from wind energy facilities; from wave energy facilities; from carbon capture and DAC facilities or other facilities and technologies. Some of the components of the systems of the present disclosure may be based on existing equipment, which require modifications for MOCCASU operations. The innovative nature of systems and processes of the present disclosure relies on the concept of combining all the carbon capture equipment and renewable energy generation equipment on the first installation, in certain embodiment all or some in modules, and all of the carbon sequestration equipment on the second installation, eliminating the challenges associated with design, fabrication, installation, interconnection, operation and servicing of one installation. The first and second installations of systems and methods of the present disclosure require minimal interfacing, being fluidly connected by the transfer conduits, and in some embodiments by a transfer buoy and/or floatation devices supporting the transfer conduits.

Systems and methods of the present disclosure may be operated using conventional and/or renewable electric power, and in certain embodiments, such as when replacing onboard equipment by raising or lower a crane, hydraulic power. One possible configuration is full renewable electric power to operate the CO2 removal units and conventionally generated electric power (sourced either from an independent source and/or from sources on or in the first installation) to operate CO2 compressors, and hydraulic power to operate the crane. In certain embodiments, both electric and hydraulic power supply may have redundant and/or back up power supplies. In certain embodiments, storage for diesel for backup power diesel generators may be present on the first installation. In certain embodiments, electric generators on the first installation may provide electric power, and backup power may be provided by battery power storage systems or other electrical power storage systems.

In certain systems the CO2 removal unit may be integrated into the hull or onto one or more of the decks of the first installation.

In certain embodiments the floatable hull may comprise a semi-submersible hull that is floating and anchored to a seabed using a mooring system.

In certain embodiments the floatable hull may comprise a ship-shape hull form that is floating and anchored to a seabed using a mooring system.

In certain embodiments the floatable hull may comprise a propulsion system integrated into the hull. In certain embodiments the floatable hull may comprise connections allowing it to be towed to location by a tug or other tow vessel. In certain embodiments the floatable hull may be a new build design. In certain embodiments the floatable hull may be a conversion from an existing floatable facility.

In certain embodiments the floatable hull may integrate one or more renewable energy systems and equipment to produce electricity and power. In certain embodiments the one or more renewable energy systems may comprise one or more hydro-turbines configured to be lowered into the water when in operation or raised above the water line during relocation. In certain embodiments the one or more renewable energy systems may comprise one or more of the following: vertical wind turbines integrated into the floatable hull; ocean current energy systems; river or other flowing water stream energy systems; and wave energy systems attached to the floatable hull.

In certain embodiments the one or more CO2 removal systems may comprise:
a) an air intake and transport system configured to move the atmospheric air into the one or more CO2 removal units comprising one or more fans or other equipment used to intake, transport and/or compress air,
b) a dehydration system to remove water from the captured CO2 and form dewatered CO2,
c) the one or more compressors are configured to compress the dewatered CO2, and
d) a manifold connecting the one or more compressors to the one or more transfer conduits (piping that fluidly and mechanically connects the manifold with one or more CO2 transfer conduits).

In certain embodiments the system may comprise one or more post-combustion CO2 capture systems to remove CO2 from 1) equipment located on the first offshore installation that requires combustion for power generation selected from gas turbines generators (GTGs), diesel engine generators and other similar equipment typically found on offshore installations and 2) fired heaters for heating medium provision.

In certain embodiments system may comprise one or more power generation equipment selected from gas turbines generators (GTGs), diesel engine driven generators and other similar equipment typically found on offshore installations to supplement renewable power generation.

In certain embodiments the system may comprise one or more fuel reception systems configured to accept natural gas from the second offshore installation, or from any other source (e.g. offshore pipeline, onshore to offshore pipeline, subsea production system, storage vessel), to use as fuel for generating power. In these other fuel gas supply methods the fuel gas may be natural gas (NG), hydrogen (H2) or a NG/H2 mixture.

In certain embodiments the first offshore installation may comprise electrical equipment to receive electrical power from an independent renewable energy power source selected from one or more seafloor mounted hydro-turbines, one or more standalone wind turbines (floating and/or attached to the seafloor) or the power grid that connects various turbines in an offshore wind development.

In certain embodiments the first offshore installation may comprise electrical equipment to receive electrical power from the second installation or other electrical power source, not necessarily renewable electrical power.

In certain embodiments the one or more $CO_2$ removal units are modular and configured to be removed, replaced, or upgraded and disconnected from and connected to decking or facility foundations (also known as "stools" for floating production, storage, and offloading (FPSO) vessels) of the floatable hull and other equipment onboard the floating hull, piping, electrical systems and control systems.

In certain embodiments the first offshore installation may comprise one or more utilities selected from one or more power generation, conversion and distribution, heating and cooling medium systems, fuel gas treatment, instrument and plant air, nitrogen system, firewater and fire-fighting systems, diesel storage distribution system, and other utility systems supporting operations typically found on offshore facilities.

In certain embodiments the first offshore installation may be operable in a manned or an unmanned mode.

In certain embodiments the first offshore installation may comprises living quarters, a potable water system, a wastewater treatment system, HVAC system and other systems common for manned operations.

In certain embodiments the first offshore installation may be a modular and scalable design allowing the one or more $CO_2$ removal units capacity to be scaled up and down per the application required.

In certain embodiments the one or more $CO_2$ transfer conduits may be selected from line pipe, flexible pipe, or a combination thereof. As used herein "flexible pipe" refers to pipe qualifying under American Petroleum Institute (API) Specification 17J, "Specification for Unbonded Flexible Pipe."

In certain embodiments the systems may further comprise one or more second compressors on or in the second installation configured to boost pressure of the captured $CO_2$ to a pressure P3 sufficient to transfer the captured $CO_2$ into the subsurface storage formation.

In certain embodiments the second installation may be a spar, semisubmersible, tension leg platform (TLP), FPSO or other floating production/$CO_2$ injection facility configuration comprising one or more natural gas production wells and one or more $CO_2$ injection wells. In certain embodiments the one or more transfer conduits may comprise one or more risers and/or a riser/pipe assembly configured to fluidly connect the first installation with the second installation, at least one of the transfer conduits being a $CO_2$ transfer conduit, at least one of the transfer conduits being a natural gas transfer conduit, the $CO_2$ transfer conduit fluidly connecting the $CO_2$ removal system with a $CO_2$ injection well on the second installation (or to a subsea production system), and the natural gas transfer conduit fluidly connecting a natural gas production well on the second installation (or part of the subsea production system) with the first installation. In certain systems a portion of the $CO_2$ transfer conduit and/or a portion of the natural gas transfer conduit may be configured to rest on a seabed. In other embodiments at least one of the $CO_2$ transfer conduits and the natural gas transfer conduit may be supported by buoyancy modules. In certain embodiments the $CO_2$ transfer conduit may comprise a first portion and a second portion, wherein the first portion originating at the first installation fluidly connects the $CO_2$ removal system and compression system with a transfer buoy, and the second portion fluidly connects the transfer buoy with the $CO_2$ injection conduit. In certain embodiments the natural gas transfer conduit may comprise a third portion and a fourth portion, wherein the third portion fluidly connects the natural gas production conduit originating at the second installation or at the subsea production system with the transfer buoy, and the fourth portion fluidly connects the transfer buoy with the first installation.

In certain embodiments the system may further comprise one or more second compressors on or in the second installation configured to boost pressure of the captured $CO_2$ to a pressure sufficient to transfer the captured $CO_2$ into the subsurface storage formation.

In certain method embodiments, the method may comprise routing the captured $CO_2$ to a dehydrating unit prior to pressurizing the captured $CO_2$ to pressure P1.

In certain method embodiments, the method may comprise
  a) routing atmospheric air into the one or more $CO_2$ removal units using one or more fans or compressors,
  b) dehydrating the captured $CO_2$ to remove water from the captured $CO_2$ and form dehydrated $CO_2$,
  c) compressing the dehydrated $CO_2$ using a compression system to form compressed, dehydrated $CO_2$, and
  d) routing the compressed, dehydrated $CO_2$ via a manifold connecting the compression system to the one or more transfer conduits.

In certain method embodiments, the step of providing the first offshore installation comprising a floatable hull may comprise:
  a) routing a floatable structure comprising the floatable hull to the first offshore location;
  b) mooring the floating structure to a seafloor at the first offshore location.

In certain method embodiments, the step of providing the first offshore installation comprising a floatable hull may comprise:
  a) routing a semi-submersible comprising the floatable hull to the first offshore location, and
  b) mooring the semi-submersible to a seafloor using a mooring system.

In certain method embodiments, the step of providing the first offshore installation comprising a floatable hull may comprise:
  routing a ship-shape hull form to the first offshore location, and
  mooring the ship-shaped hull to a seafloor using a mooring system.

In certain method embodiments, the method may comprise pressurizing the captured $CO_2$ from pressure P2 to pressure P3, where pressure P3 is sufficient to transfer the captured $CO_2$ through one or more $CO_2$ wells into a subsurface storage formation selected from a depleted oil/gas reservoir, a saline aquifer, or other rock strata.

The term "floating second offshore installation" is to be interpreted to include, but is not limited to, floating platforms, floating drill ships, semisubmersibles, TLPs, spars, and FPSOs. As used herein the term "subsea" includes oceans, bays, rivers, bayous, gulfs, and includes deepwater and non-deepwater. As used herein "riser" means a standard riser (steel or flexible pipe as used in the offshore oil and gas industry to produce or inject fluids), either a low-pressure riser or a high-pressure riser. As used here within "riser/flowline assembly" means one or more risers fluidly connected to a flowline segment, comprised of line pipe or flexible pipe, in a riser/flowline/riser configuration or riser/flowline configuration.

In certain embodiments the second installation may be a subsea system (sometimes referred to as a subsea production system) comprising one or more of the following: subsea trees, manifolds, flowlines, controls, controls lines, umbilicals and other subsea equipment. In certain of these embodiments, the first installation may be fluidly and mechanically connected directly to a subsea $CO_2$ injection tree. In certain other embodiments, the first installation may be fluidly and mechanically connected directly to a subsea $CO_2$ injection manifold and a NG production tree or NG production manifold that is tied directly to the first installation fuel gas system.

In certain embodiments a logic device may be provided to control one or more systems, sub-systems, and components, such as $CO_2$ removal units, compressors, wind turbines, GTGs, and the like. Logic devices may be configured to be operated and/or viewed from a Human/Machine Interface (HMI) wired or wirelessly connected to the logic device. Certain embodiments may include one or more audio and/or visual warning devices configured to receive communications from the logic device upon the occurrence of a pressure rise (or fall) in a sensed pressure above (or below) a set point pressure, or a change in concentration of one or more sensed concentrations or temperatures, or both, above one or more set points. The occurrence of a change in other measured parameters outside the intended ranges may also be alarmed in certain embodiments. Other measured parameters may include, but are not limited to, pressure, temperature, liquid or gas flow rate, and gas or liquid density.

Certain system and method embodiments of this disclosure may operate in modes selected from the group consisting of automatic continuous mode, automatic periodic mode, and manual mode.

In certain embodiments, pressure (P) and/or temperature (T) may be sensed on inlet and outlet of compressors, and inside transfer conduits. Different sensor strategies may be used on each component, sub-system, or system, for example, a first type of mass flow sensor for sensing mass flow inside a $CO_2$ transfer conduit, another sensing mass flow inside a natural gas transfer conduit. All combinations of sensing T, P, and/or mass flow inside and/or outside one or more components, systems, and sub-systems are disclosed herein and considered within the present disclosure.

With respect to "semi-submersible", "ship-shaped", "spar", and "TLP" these terms have generally understood meaning in the art and the terms connote sufficient structure to persons of ordinary skill in the art. For semi-submersibles, see for example U.S. Pat. Nos. 3,986,471 and 6,009,820, the latter of which explains that a semi-submersible vessel comprises a deck section which is typically supported by four or more vertical columns which rest on two or more pontoons. The pontoons and portions of the columns are submerged below the operational water line during normal operation. In order to provide adequate structural integrity, cross brace support members are typically used between the columns. The '820 patent improvement includes the use of an uncross-braced column stabilized design. and the terms connote sufficient structure to persons of ordinary skill in the art. Either version (cross-braced or uncross-braced) may be suitable for use in the systems and methods of the present disclosure, as long as the structure has sufficient structural strength to support (and in some embodiments enclosing) accommodations, cranes, $CO_2$ removal systems, including air intake units, $CO_2$ removal units, $CO_2$ dehydrators, $CO_2$ compressors, wind turbines, ocean current and/or wave energy systems, gas turbine generators, diesel generators, and associated components, for example, but not limited to pressure control devices (backpressure valves), pressure relief devices (valves or explosion discs), pipes, conduits, vessels, towers, tanks, mass flow meters, temperature and pressure indicators, heat exchangers, pumps, and quick connect/quick disconnect (QC/QD) features for connecting and disconnecting transfer conduits to $CO_2$ removal systems, and the like. A "platform" as used herein, when referring to the second installation, includes a floating structure having a deck supporting a production tree, a production wellhead, a $CO_2$ injection tree and wellhead, and associated equipment. Alternatively, a platform may be a floating structure having a deck supporting risers, umbilicals, subsea control systems, power units and associated equipment in conjunction with a subsea system utilizing subsea production and injection trees and wellheads located on the seafloor.

Suitable spars include but are not limited to those disclosed in U.S. Pat. Nos. 5,875,728; 6,196,768; and 8,251,005. As explained briefly in the '005 patent, spar designs provide a heave resistant, floating structure characterized by an elongated, vertically disposed hull. Most often this hull is cylindrical, buoyant at the top and with ballast at the base. The hull may be anchored to the ocean floor through risers, tethers, and/or mooring lines.

So-called tension-leg platforms, or TLPs, are discussed in, for example, U.S. Pat. Nos. 5,135,327 and 5,575,592. As explained in the '327 patent, in a TLP the vertical tension legs are located at or within the corner columns of the semi-submersible platform structure. The tension legs are maintained in tension at all times by ensuring that the buoyancy of the TLP exceeds its operating weight under all environmental conditions. When the buoyant force of the water displaced by the platform/structure at a given draft exceeds the weight of the platform/structure (and all its internal contents), there is a resultant "excess buoyant force" that is carried as the vertical component of tensions in the mooring elements (and risers). When stiffly elastic continuous tension leg elements called tendons are attached between a rigid sea floor foundation and the corners of the floating hull, they effectively restrain vertical motions due to both heave and pitch/roll inducing forces while there is compliant restraint of movements in the horizontal plane (surge/sway and yaw). Thus, a tension leg platform provides a very stable floating offshore structure for supporting equipment and carrying out functions related to oil production. See for example U.S. Pat. Nos. 5,135,327 and 5,575,592.

The pressure P1 produced by the $CO_2$ compressor on the first installation may, in some embodiments, range from about 500 psi to about 5,000 psi or greater; alternatively greater than about 700 psi; alternatively greater than about 800 psi; alternatively greater than about 1,000, or greater than about 2,000 psi, or greater than about 3,000 psi. For example, pressure P1 may range from about 2,000 to about 5,000 psi; or from about 2,500 to about 4,500 psi; or from about 3,000 to about 4,000; or from about 2,500 to about 5,000 psi; or from about 2,000 to about 4,500 psi; or from about 2,000 to about 3,000 psi; or from about 4,000 to about 5,000 psi; or from about 3,000 to about 5,000 psi. Pressure P2 depends largely on the pressure drop experienced in the $CO_2$ transfer conduit. P3 could be the same as P2 or greater when using secondary compression on the second installation. All ranges and sub-ranges (including endpoints) between about 500 psi and about 5,000 psi are considered explicitly disclosed herein.

In certain embodiments, the CO2 removal system, or components thereof, may be located on one of the decks of the hull of the floating structure of the first installation; in certain embodiments, in a dedicated container or containers or modules fabricated for this purpose.

With respect to data connection/integration, in certain embodiments control signals for the components of systems of the present disclosure, as well as parameters measured or captured by the system's sensors (e.g., pressures, temperatures, fluid flow rates and density, etc.) may be transmitted to and from control rooms on the first installation from and to the second installation. In certain embodiments, control lines may be employed for this data transmission. In other embodiments, wireless communication may be employed for data transmission. On the first installation, the data may be integrated at different levels, potentially with different control systems. This integration may be similar to data connection and integration with rig's systems currently implemented on various drilling systems. Examples of control systems which can potentially integrate data to and from the systems of the present disclosure include control systems for CO2 removal/DAC operations, renewable energy generation, storage, usage, and the like, conventional energy generation, distribution, storage, and the like. In certain embodiments, data integration may require running cables between different locations on the first installation and/or the second installation. Industry standards, operator requirements, and/or local laws may dictate cable routing configurations.

Figure 2:
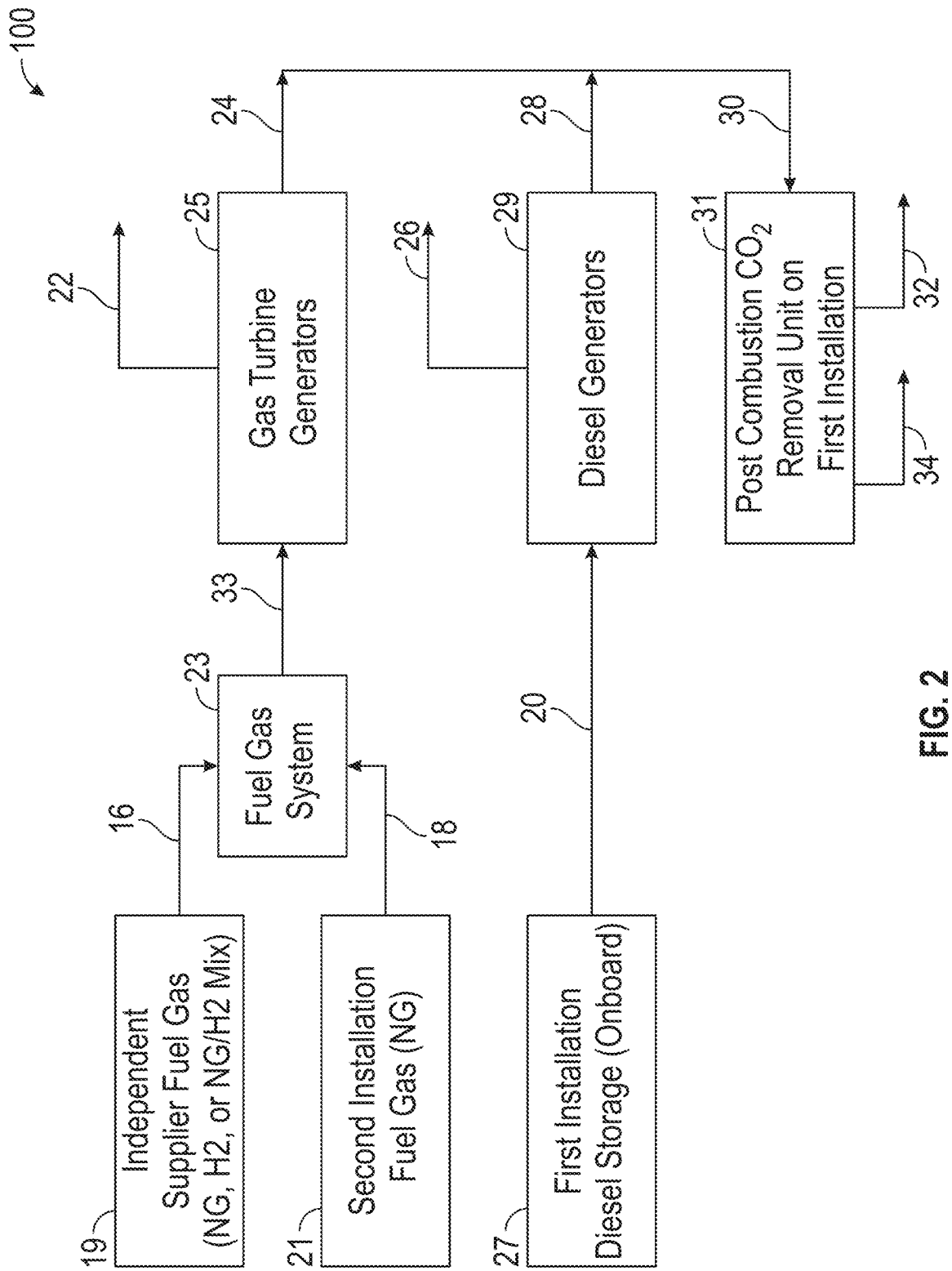
FIG. 2 is a schematic utility flow diagram of the MOC-CASU embodiment of FIG. 1, illustrating fuel flow for power generation in accordance with the present disclosure.
Figure 3:
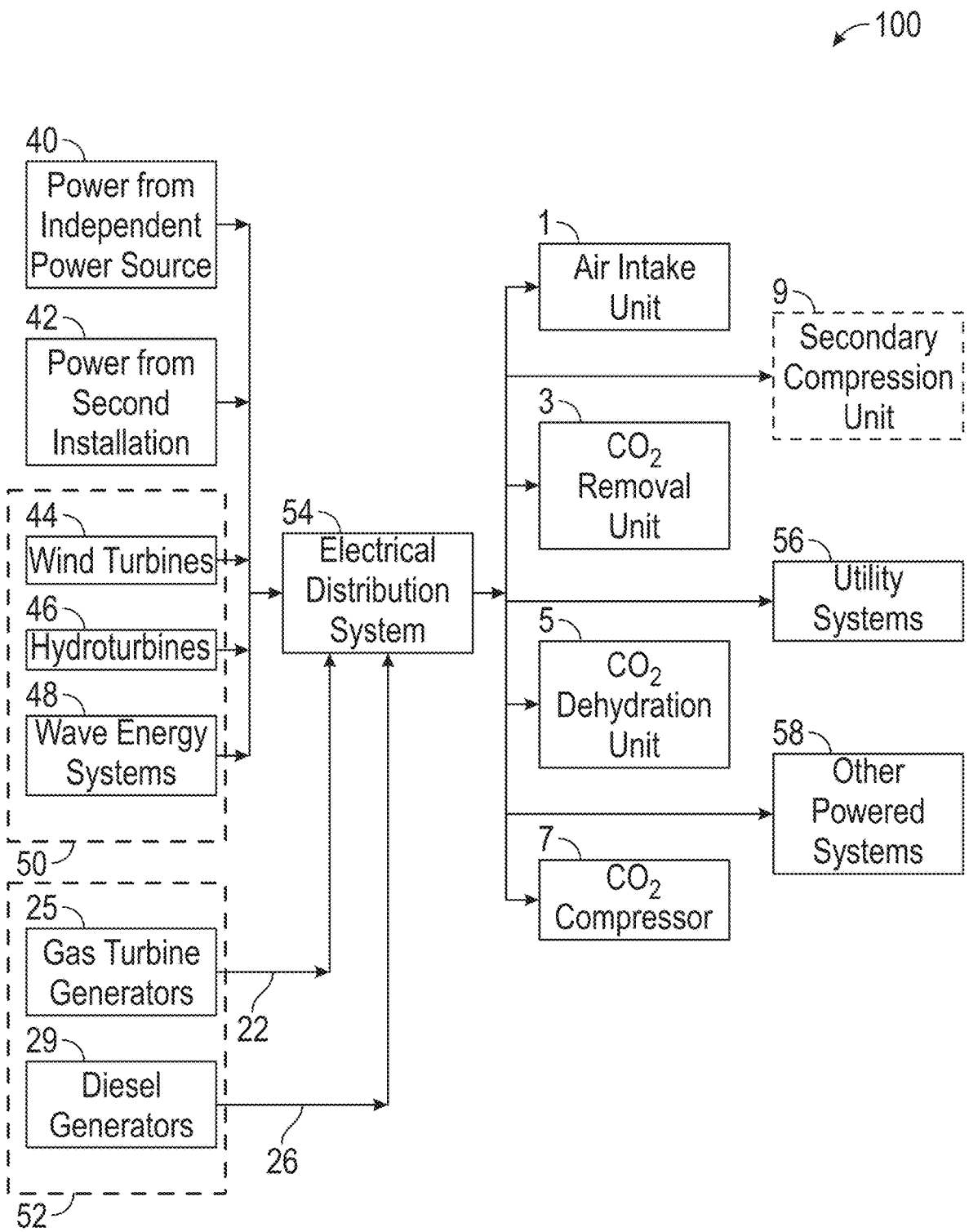
FIG. 3 is a schematic utility flow diagram of the MOC-CASU embodiment of FIGS. 1 and 2, illustrating electricity generation and distribution in accordance with the present disclosure.

Referring now to the drawing figures, FIG. 1 is a high-level schematic diagram illustrating one MOCCASU system and method embodiment 100 in accordance with the present disclosure. FIG. 2 is a schematic utility flow diagram of the MOCCASU embodiment 100 of FIG. 1, illustrating fuel flow for power generation in accordance with the present disclosure. FIG. 3 is a schematic utility flow diagram of the MOCCASU embodiment 100 of FIGS. 1 and 2, illustrating electricity generation and distribution in accordance with the present disclosure. Embodiment 100 includes an air intake 1, a CO2 removal unit 3, a CO2 dehydration unit 5 (optional in certain embodiments as indicated by the dashed box), a CO2 compression unit 7 (compressor), a CO2 secondary compression unit 9 (optional in certain embodiments as indicated by the dashed box), and a CO2 injection well 11. Air intake 1, CO2 removal unit 3, CO2 dehydration unit 5, CO2 compression unit 7 (compressor), and CO2 secondary compression unit 9 (and associated conduits and controls for each) may all be modular.

Still referring to FIG. 1, air intake 1 accepts an atmospheric air stream 2 and produces an air inlet stream 4 that serves as feed to one or more CO2 removal units 3, which in turn produces a CO2 depleted air stream 6 and a captured CO2 stream 8. In certain embodiments, some or all of captured CO2 stream 8 may be routed to optional dehydration unit 5 to produce a dehydrated, captured CO2 stream 10. Compression unit 7 increases pressure of captured CO2 stream 8 or dehydrated, captured CO2 stream 10 (or mixture thereof) to produce a pressurized, dehydrated, captured CO2 stream 12 having pressure P1 at an inlet to one or more CO2 transfer conduits 12. CO2 drops in pressure from P1 at entry to CO2 transfer conduit 12 to P2 at exit of CO2 transfer conduit 12 and entry to CO2 injection well 11, or entry to CO2 secondary compression unit 9. In embodiments where CO2 secondary compression unit 9 is employed it will form stream 14, optionally, to compress the dehydrated, captured CO2 from P2 to P3, if needed, where P2<P3. A compressed, dehydrated, captured CO2 stream 17 exits CO2 injection well 11 and is injected into a subsea well 15 and subsequently a storage reservoir for sequestration.

FIG. 2 is a schematic utility flow diagram of MOCCASU embodiment 100 of FIG. 1, illustrating one possible fuel flow scheme for power generation in accordance with the present disclosure, and FIG. 3 is a schematic utility flow diagram of MOCCASU embodiment 100 of FIGS. 1 and 2, illustrating one possible electricity generation and distribution scheme in accordance with the present disclosure.

Referring to FIG. 2, a fuel gas stream 16 (natural gas, hydrogen or natural gas/hydrogen mixture) may be received by a fuel gas system 23 on the first installation from an independent supplier (not on first or second installations) as exemplified in FIG. 2 by box 19. A fuel gas stream 18 (natural gas) may be received by fuel gas system 23 from the second installation, as exemplified in FIG. 2 by box 21. Fuel gas system 23 forms a combined fuel gas stream 33 that may serve as feed fuel gas to one or more gas turbine generators (GTGs), 25, on the first installation, which produce power 22 for first installation systems and components, and a post combustion gas stream 24. A diesel fuel stream 20 from first installation diesel storage 27 may be received by one or more diesel generators 29 on the first installation to produce electric power 26 for first installation systems and components. A post combustion exhaust gas stream 28 from diesel generators 29 may be combined with post combustion gas stream 24 to form a combined post combustion gas stream 30, which may then be routed to a post combustion CO2 removal unit 31 on the first installation, which produces a CO2 depleted combustion gas stream 32 that is vented to atmosphere, and a CO2 rich stream 34 that is routed to the CO2 dehydration unit 5 (FIG. 1) on the first installation.

Referring now to FIG. 3, where it will be understood that all lines and arrows connecting the boxes are electricity flow in this schematic illustration, power may be received by an electrical distribution system 54 on the first installation from:

- an independent power source, as exemplified by box 40; and/or
- the second installation, as exemplified by box 42; and/or
- one or more wind turbines 44 on the first installation (for example, attached to or built integral to the deck and hull of the floating structure); and/or
- one or more hydroturbines 46 retractably or non-retractably attached to the first installation (for example, either the hull or the pontoons, or both, of the floating structure); and/or
- one or more wave energy systems 48 retractably or non-retractably attached to the first installation (for example, either the hull or the pontoons, or both, of the floating structure); and/or
- one or more GTG 25 on the first installation; and/or
- one or more diesel generators 29 on the first installation.

The wind turbines 44, hydroturbines 46, and/or wave energy systems 48 may be deemed a renewable energy source or sources, 50, integrated into first installation 60, illustrated schematically in FIGS. 4-9, as exemplified by the dashed line surrounding boxes 44, 46, and 48 in FIG. 3. The GTGs 25 and diesel generators 29 may be deemed a combustion power source or sources 52 onboard first installation, as exemplified by the dashed line surrounding boxes 25 and 29.

Still referring to FIG. 3, electrical distribution system 54 distributes electricity to air intake unit 1, CO2 removal unit 3, optional CO2 dehydration unit 5, and CO2 compressor 7, as well as to utility systems 56 onboard the first installation, and other systems and components (such as flow meters and the like) requiring electrical power. Optionally, electricity may be distributed to the CO2 secondary compression unit 9 on the second installation.

Figure 4:
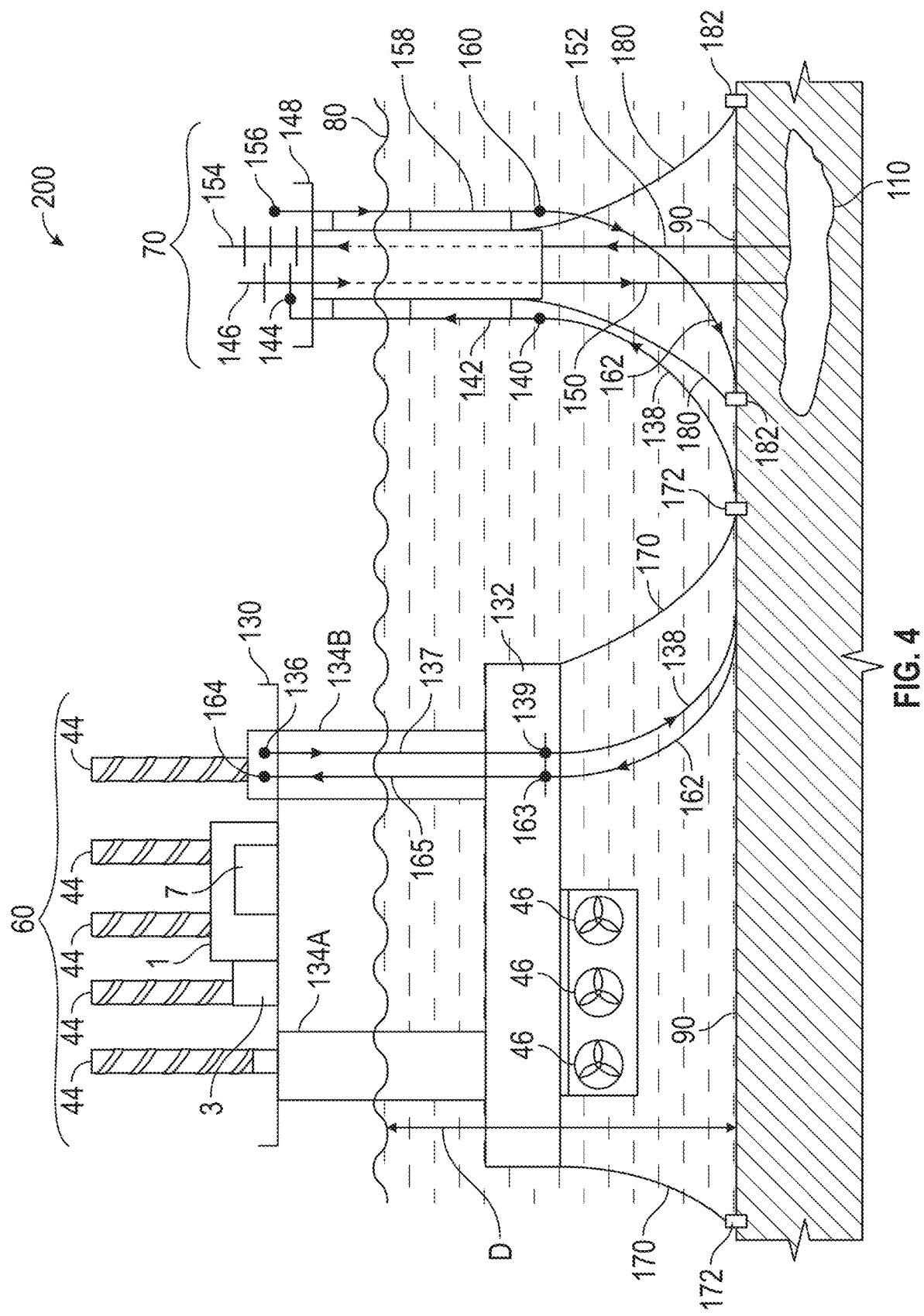
FIGS. 4, 5, 6, 7, 8, and 9 are schematic illustrations of six other system embodiments in accordance with the present disclosure.

FIG. 4 is a schematic side elevation view of an embodiment 200 employing a first installation 60 including a semi-submersible structure, and a second installation 70 including a spar structure, in accordance with the present disclosure. For orientation, the water surface is indicated at 80, the seafloor (seabed) is indicated at 90, depth of water at D (being the difference in elevation between the water surface 80 and the seafloor 90), and a subsea reservoir is indicated at 110. It will be understood that reservoir 110 in FIG. 4 is simplified for brevity: CO2 injection and NG production will take place from either 1) two separate and distinct reservoirs, or 2) isolated and distinct zones within one reservoir. Although the reservoir 110 is illustrated in FIGS. 4-7 as directly underneath second installation 70 or the subsea production system 230 as illustrated schematically in FIGS. 8 and 9, this need not be the case in all embodiments. As illustrated schematically in FIG. 4, first installation 60 of embodiment 200 includes a deck 130 of a semi-submersible mobile vessel having two horizontal hulls 132 (only one of two is shown). Connecting deck 130 to horizontal hulls 132 are cylindrical or rectangular columns 134A, 134B (two of four illustrated). Also illustrated on deck 130 are modular air intake 1, a modular CO2 removal unit 3, and a modular CO2 compression unit 7 (compressor), as well as several wind turbines 44 attached directly to deck 130, or horizontal hulls 132, or to columns 134A, 134B, or to other foundation structure attached to the deck 130. More or less than five wind turbines maybe present, and each may be secured to deck 130 or other foundation structure. They may be removed or secured below deck 130 during transit operations, for example by a deck-mounted crane (not illustrated) or other crane. Also illustrated are three wave energy generators 46 retractably positioned under horizontal hull 132, it being understood that more or less than three may be present, or none, and the wave energy generators may be retractable individually or as a set. Also illustrated are mooring lines 170 used to moor first installation 60 with seabed anchors 172.

Still referring to FIG. 4 and embodiment 200, there is further illustrated a second installation 70 including a spar that is secured to the seafloor 90 using mooring lines 180 and anchors 182. The spar of second installation 70 includes a deck 148 on which are positioned a CO2 injection tree 146 and a natural gas production tree 154. CO2 injection tree 146 fluidly connects to a CO2 injection well 150, while natural gas production tree 154 fluidly connects to a natural gas production well 152, and both wells 150, 152 fluidly connect to reservoir 110.

In accordance with embodiment 200, CO2 that is captured and compressed at first installation 60 is transfer to second installation 70 via CO2 supply transfer riser upper connector 136, CO2 supply transfer riser 137, CO2 supply transfer riser lower connector 139, CO2 transfer conduit (riser/flowline/riser configuration) 138, CO2 injection riser lower connector 140, CO2 injection riser 142, and CO2 injection riser upper connector 144, which fluidly connects to CO2 injection tree 146.

Similarly, in accordance with embodiment 200, natural gas produced at second installation 70 is transferred to first installation 60 via natural gas production riser upper connector 156, natural gas production riser 158, natural gas production riser lower connector 160, natural gas transfer conduit (riser/flowline/riser configuration) 162, natural gas supply riser lower connector 163, natural gas supply riser 165, and natural gas supply riser upper connector 164.

In embodiment 200, both transfer conduits 138, 162 (riser/flowline/riser configurations) lie on seabed 90 for a portion of their lengths.

Figure 5:
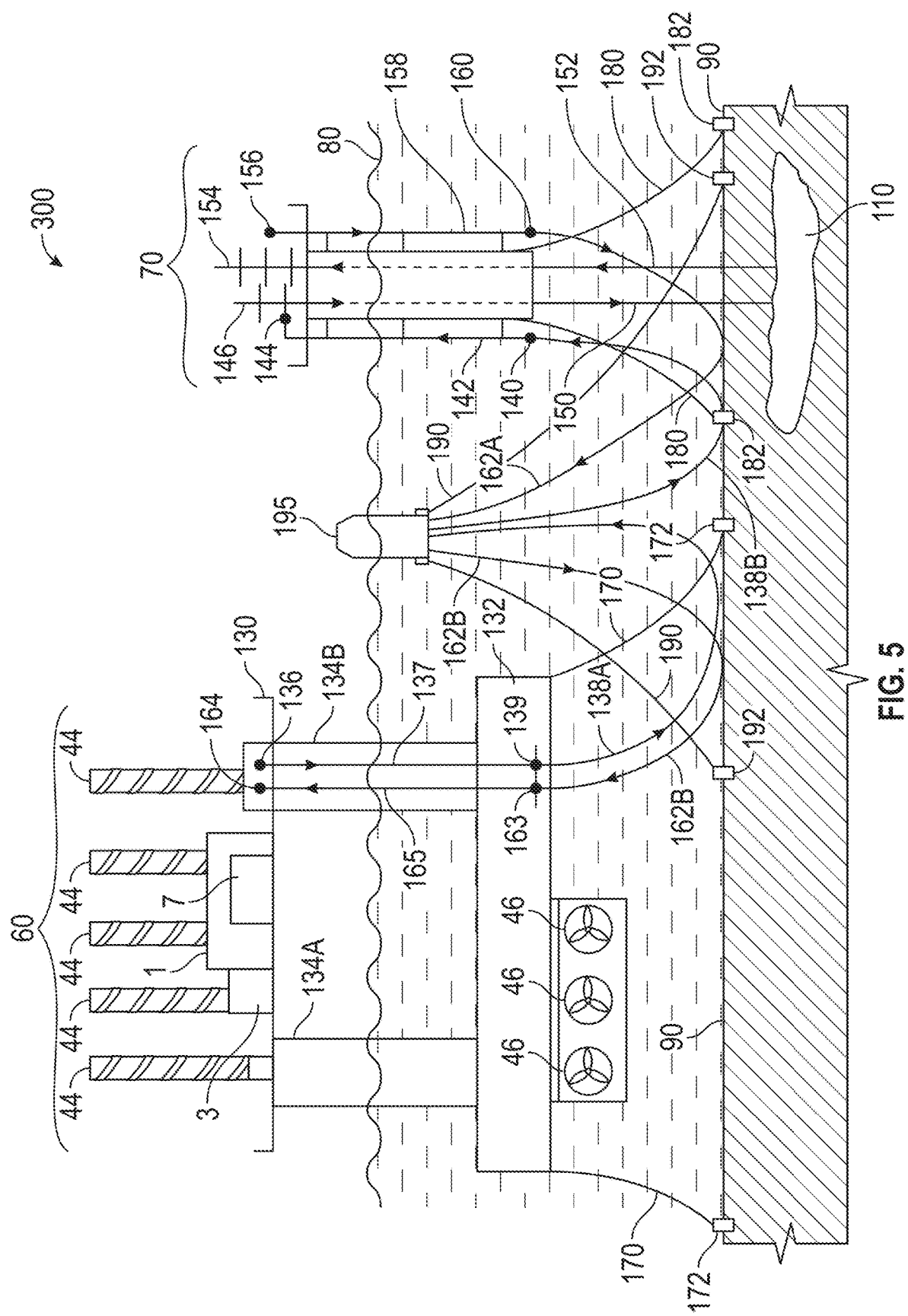

Referring now to FIG. 5, embodiment 300 is similar to embodiment 200, but includes a transfer buoy 195 secured to seabed 90 by mooring lines 190 and anchors 192. Transfer buoy serves to provide lift for CO2 transfer conduits 138A, 138B, as well as natural gas transfer conduits 162A, 162B. Transfer buoy 195 may be partially submerged, as illustrated in embodiment 200, or may be fully submerged in some embodiments. CO2 transfer conduit 138A fluidly connects to CO2 supply riser 137 through connector 139, while CO2 transfer conduit 138B fluidly connects to CO2 injection riser 142 through connector 140. Natural gas transfer conduit 162A fluidly connects with natural gas production riser 158 through connector 160, and natural gas transfer conduit 162B fluidly connects with natural gas supply riser 165 through connector 163. Examples of suitable transfer buoys include those described in U.S. Pat. Nos. 4,279,047 and 4,254,521; those described in U.S. Pub. Patent App. No. US20130231015; and in WO2004078578.

Figure 6:
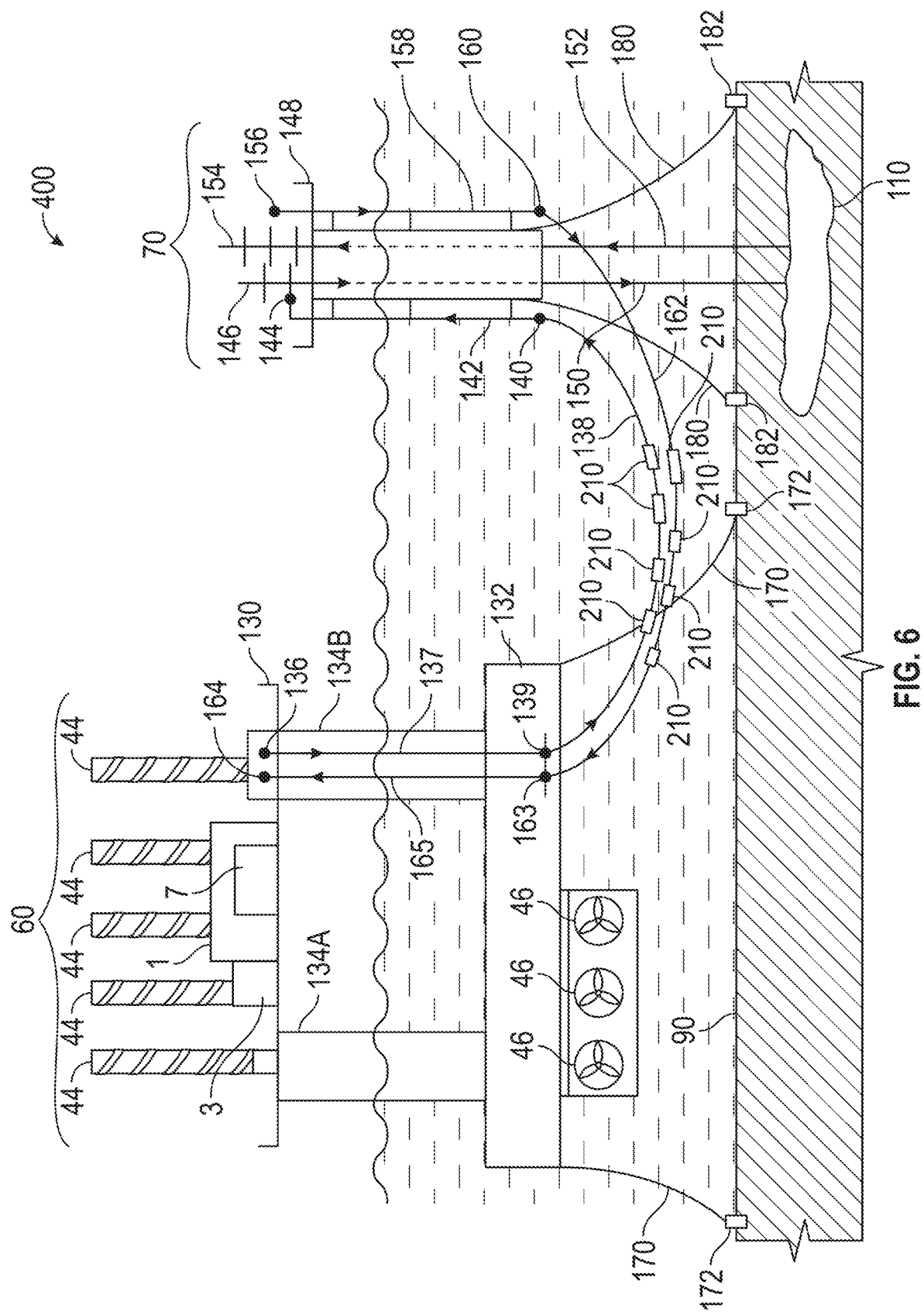

Embodiment 400, illustrated schematically in FIG. 6, is similar to embodiment 200, but includes a plurality of buoyancy modules 210 removably attached to transfer conduits 138, 162. Suitable buoyancy modules 210 include, but are not limited, those that clamp directly to subsea risers. In certain embodiments, the buoyancy modules may be integral buoyancy modules, which combine the functions of the clamp and the buoyancy element into one unit, such as available from CRP Subsea Ltd., Lancashire, UK. The buoyancy element itself may be comprised of a syntactic foam composite material synthesized by filling a metal, polymeric, or ceramic matrix with hollow or non-hollow spheres. The material has the characteristics of low density (density ranging from about 0.35 to about 0.7 $g/cm^3$), low water absorption ($\leq 2\%$), high mechanical strength (compressive strength ranging from about 1 to about 100 MPa), corrosion resistance, and secondary mechanical processing, and may be employed at depths up to about 11,000m. Another material that may be employed is a low-density, high-strength porous polyurethane-epoxy resin rigid foam composite material made by a chemical foaming reaction. These materials may have density ranging from about 0.08 to about 0.25 $g/cm^3$; a compressive strength ranging from about 0.5 to about 1 MPa; water absorption$\leq 2\%$; and may be employed at depths up to about 100m. Both materials are available from Qingdao Doowin Marine Engineering Co., Ltd., Qingdao, China.

Figure 7:
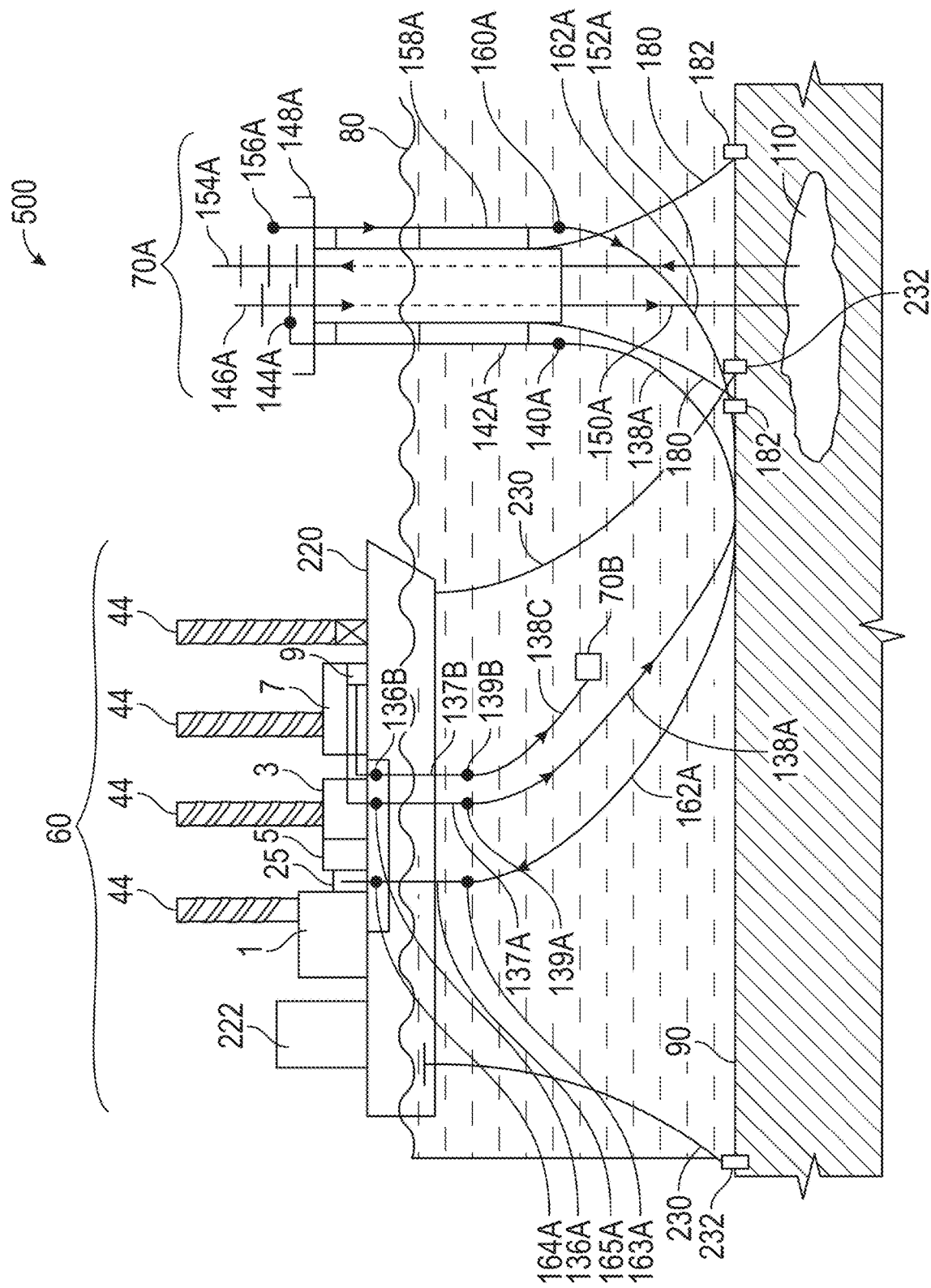

Referring now to FIG. 7, there is illustrated schematically another system embodiment 500. Embodiment 500 includes a first installation 60 and one or more second installations, 70A, 70B, the latter being represented simply by a box for brevity. First installation includes a ship-shape hull 220 having space for living quarters and a control room 222. Also illustrated on shape-ship hull 220 are modular air intake 1, a modular CO2 removal unit 3, and a modular CO2 dehydration unit 5, and a modular CO2 compression unit 7 (compressor), as well as several wind turbines 44 attached directly to hull 220 or to other foundation structure attached to hull 220. More or less than four wind turbines maybe present, and each may be secured to hull 220 or other foundation structure. They may be removed or secured in or on hull 220, for example using a deck-mounted crane (not illustrated) or other installation equipment. Also illustrated are mooring lines 230 used to moor ship-shape hull 220 with seabed anchors 232.

Still referring to FIG. 7 and embodiment 500, there is further illustrated a second installation 70A including a spar that is secured to the seafloor 90 using mooring lines 180 and anchors 182. The spar of second installation 70 includes a deck 148A on which are positioned a CO2 injection tree 146A and a natural gas production tree 154A. CO2 injection tree 146A fluidly connects to a CO2 injection well 150A, while natural gas tree 154A fluidly connects to a natural gas production well 152A, and both wells 150A, 152A fluidly connect to reservoir 110.

In accordance with embodiment 500, CO2 that is captured and compressed at first installation 60 is transfer to one or more second installations 70A, 70B. CO2 transfer to second installation 70A proceeds via CO2 supply riser upper connector 136A, CO2 supply riser 137A, CO2 supply riser lower connector 139A, CO2 transfer conduit (riser/flowline/riser configuration) 138A, CO2 injection riser lower connector 140A, CO2 injection riser 142A, and CO2 injection riser upper connector 144A, which fluidly connects to CO2 injection tree 146A. Similarly, CO2 transfer to second installation 70B proceeds via CO2 supply riser upper connector 136B, CO2 supply riser 137B, CO2 supply riser lower connector 139B, CO2 transfer conduit 138C. The flow connections for second installation 70B are not illustrated for brevity.

Similarly, in accordance with embodiment 500, natural gas produced at second installation 70A is transferred to first installation 60 via natural gas production riser upper connector 156A, natural gas production riser 158A, natural gas production riser lower connector 160A, natural gas transfer conduit (riser/flowline/riser configuration) 162A, natural gas supply riser lower connector 163A, natural gas supply riser 165A, and natural gas supply riser upper connector 164. Second installation 70B may or may not supply natural gas as fuel to first installation 60, depending on the embodiment.

In embodiment 500, transfer conduits 138A, 138C, and 162A lie on seabed 90 for a portion of their lengths.

Figure 8:
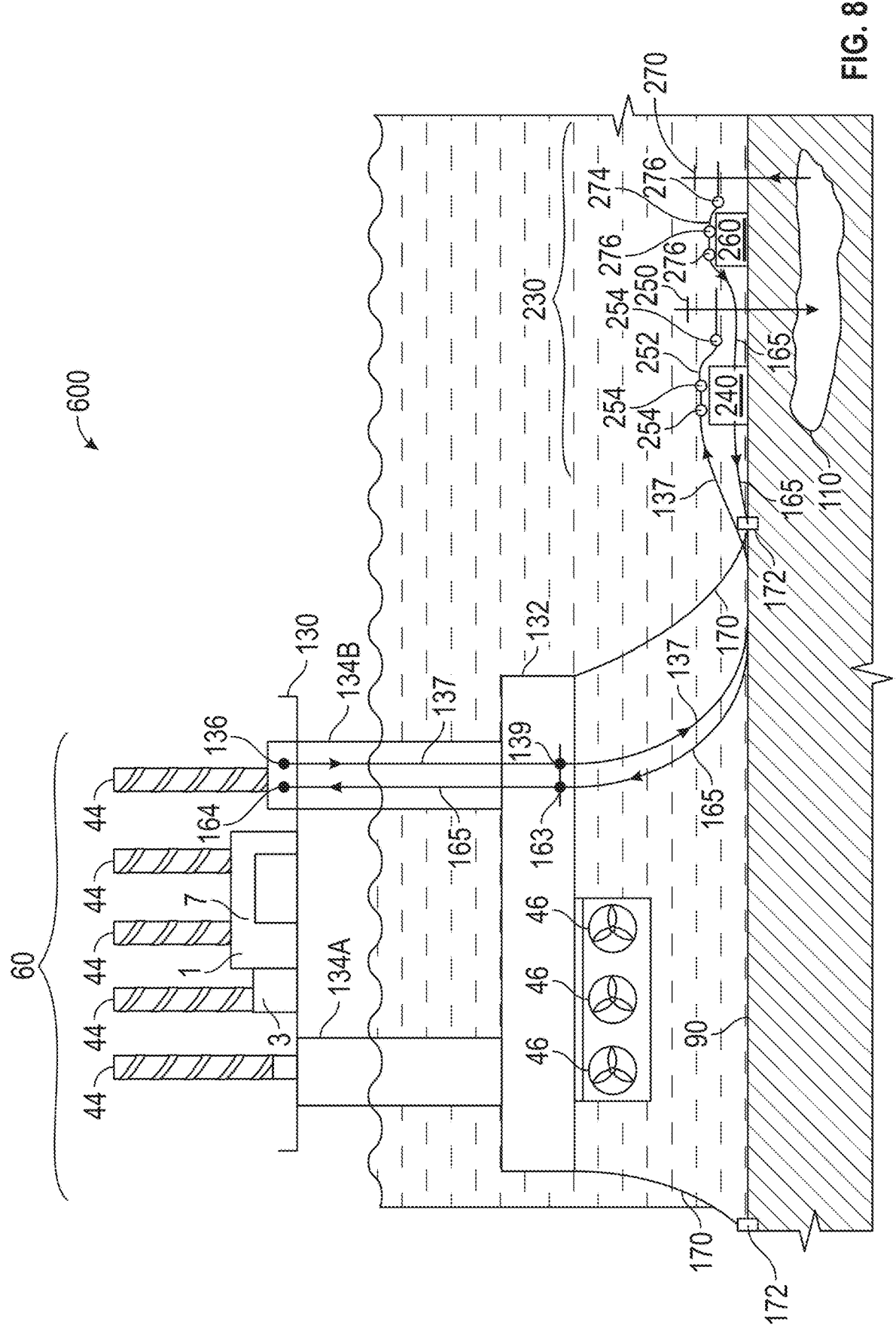
Figure 9:
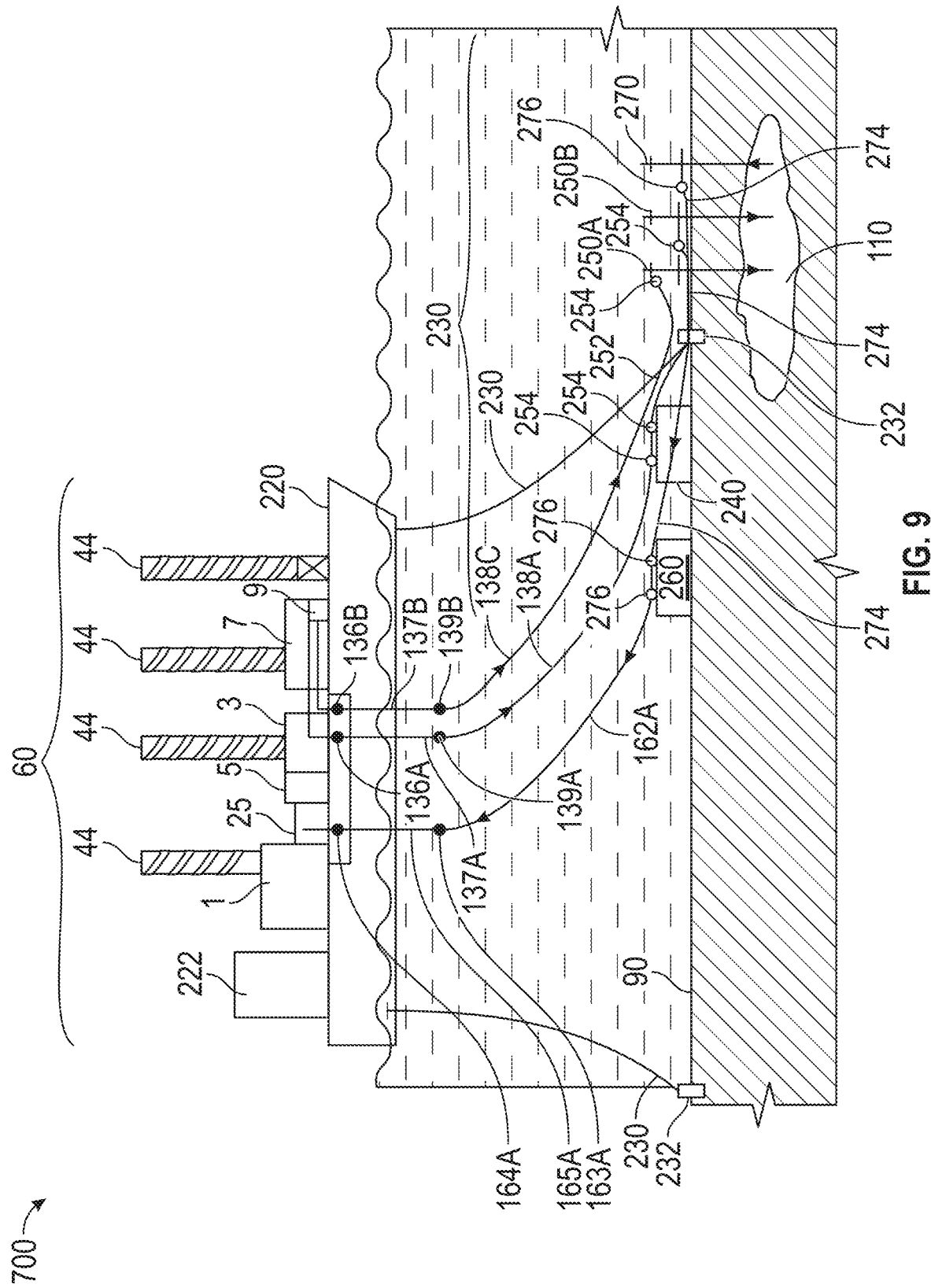
Figure 10:
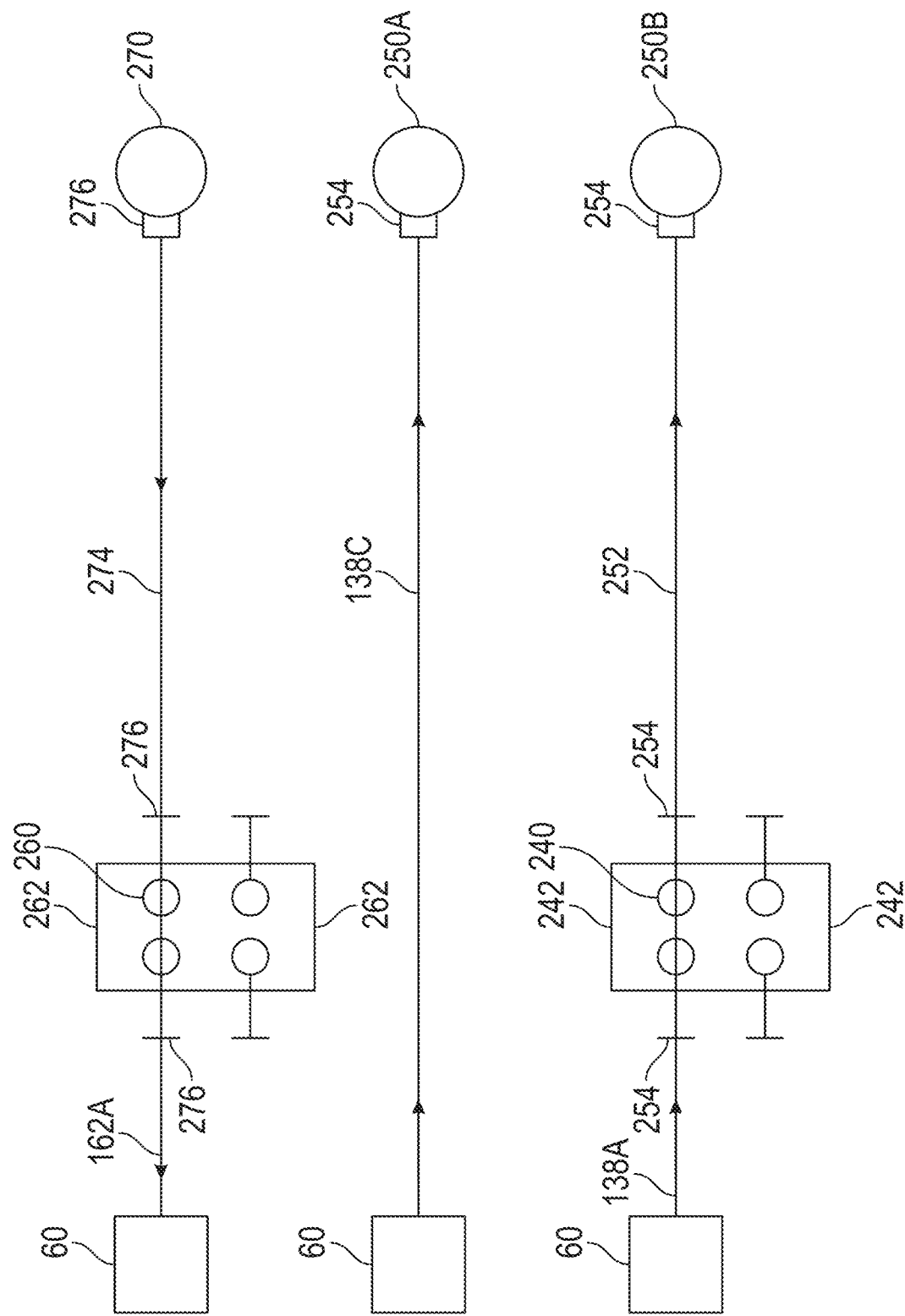
FIG. 10 is a subsea system layout diagram for the embodiment of FIG. 9.

Referring now to FIGS. 8, 9, and 10 these figures illustrate schematically two other embodiments 600 and 700 of the present disclosure having first installation 60 fluidly and mechanically connected to a subsea production system 230, the latter including a subsea CO2 injection manifold 240, a subsea CO2 injection tree 250 (250A, 250B in FIG. 9), CO2 injection jumper conduit 252 (but note, CO2 injection conduit 138C connects directly to tree 250A with no CO2 injection jumper conduit), and CO2 connectors and valves 254 as illustrated schematically. Embodiments 600 and 700 also include a subsea NG production manifold 260, a subsea NG production tree 270, NG jumper conduit 274, and NG connectors and valves 276, as illustrated schematically. First installation 60 in embodiment 600 (FIG. 8) includes a semi-submersible vessel substantially as previously described with embodiment 400 (FIG. 6), while in embodiment 700 (FIG. 9) first installation 60 includes a ship shape vessel substantially as previously described with embodiment 500 (FIG. 7).

FIG. 10 illustrates a detailed schematic plan view of the subsea system layout employed in system embodiment 700 of FIG. 9. This view includes subsea foundations 242, 262 for subsea CO2 injection manifold 240 and subsea natural gas production manifold 260, respectively. As clearly detailed, captured CO2 may be injected directly into subsea CO2 injection tree 250A, indirectly into subsea CO2 injection tree 250B through subsea CO2 manifold 240, or both.

Figure 11:
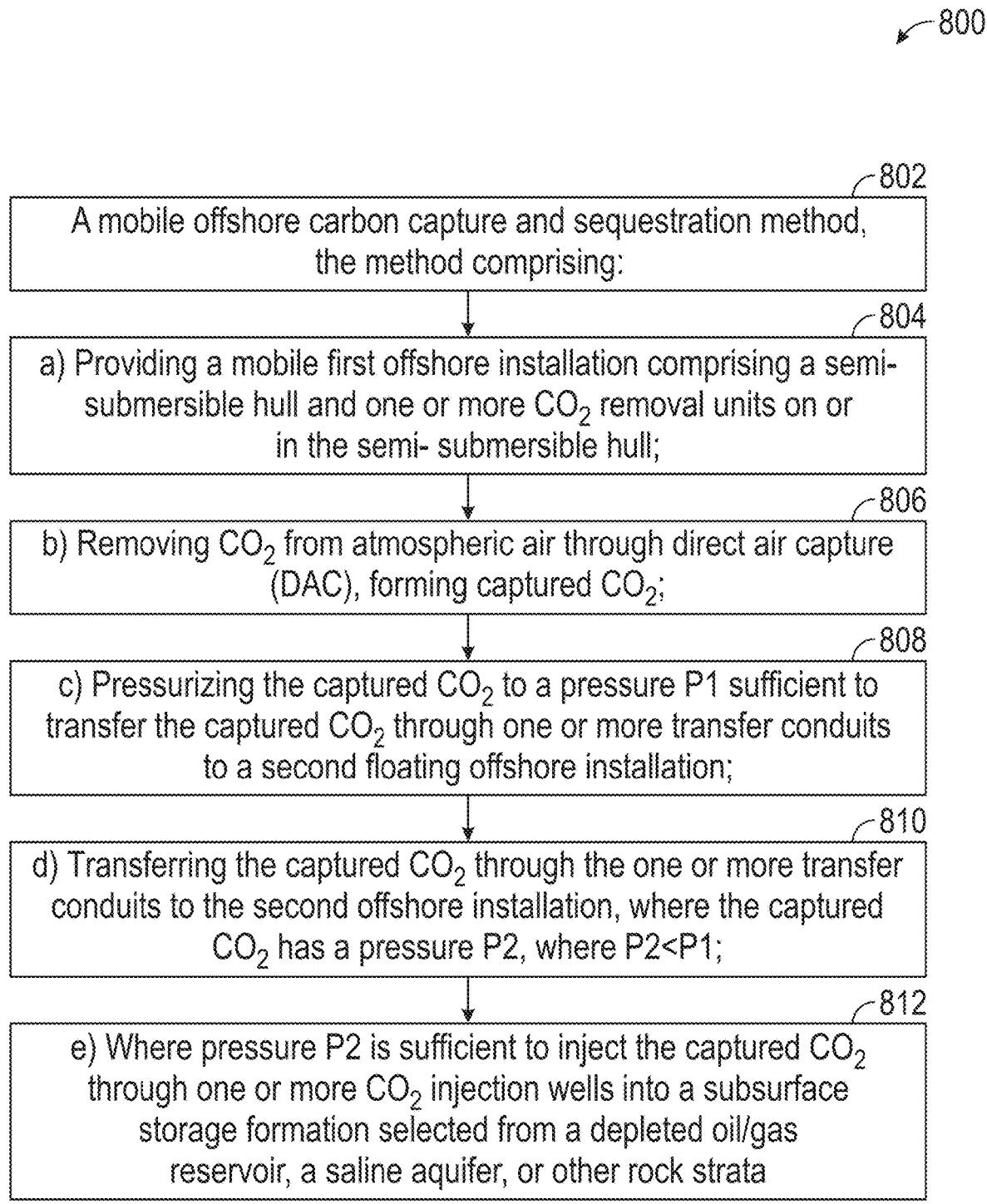
FIGS. 11-14 are schematic logic diagrams of four methods in accordance with the present disclosure.

FIGS. 11, 12, 13, and 14 are schematic logic diagrams of four non-limiting method embodiments 800, 900, 1000, and 1100 in accordance with the present disclosure. Method embodiment 800 illustrated schematically in FIG. 11 is a mobile offshore carbon capture and sequestration method (box 802), including the steps of a) providing a first offshore installation comprising a semi-submersible floatable hull, the floatable hull comprising one or more CO2 removal units thereon or therein (box 804); b) removing CO2 from atmospheric air through Direct Air Capture (DAC), forming captured CO2 (box 806); c) pressurizing the captured CO2 to a pressure P1 sufficient to transfer the captured CO2 through one or more transfer conduits to a second offshore installation (box 808); d) transferring the captured CO2 through the one or more transfer conduits to the second offshore installation, where the captured CO2 has a pressure P2, where P2<P1 (box 810); e) where pressure P2 is sufficient to inject the captured CO2 through one or more CO2 injection wells into a subsurface storage formation selected from a depleted oil/gas reservoir, a saline aquifer, or other rock strata (box 812).

Figure 12:
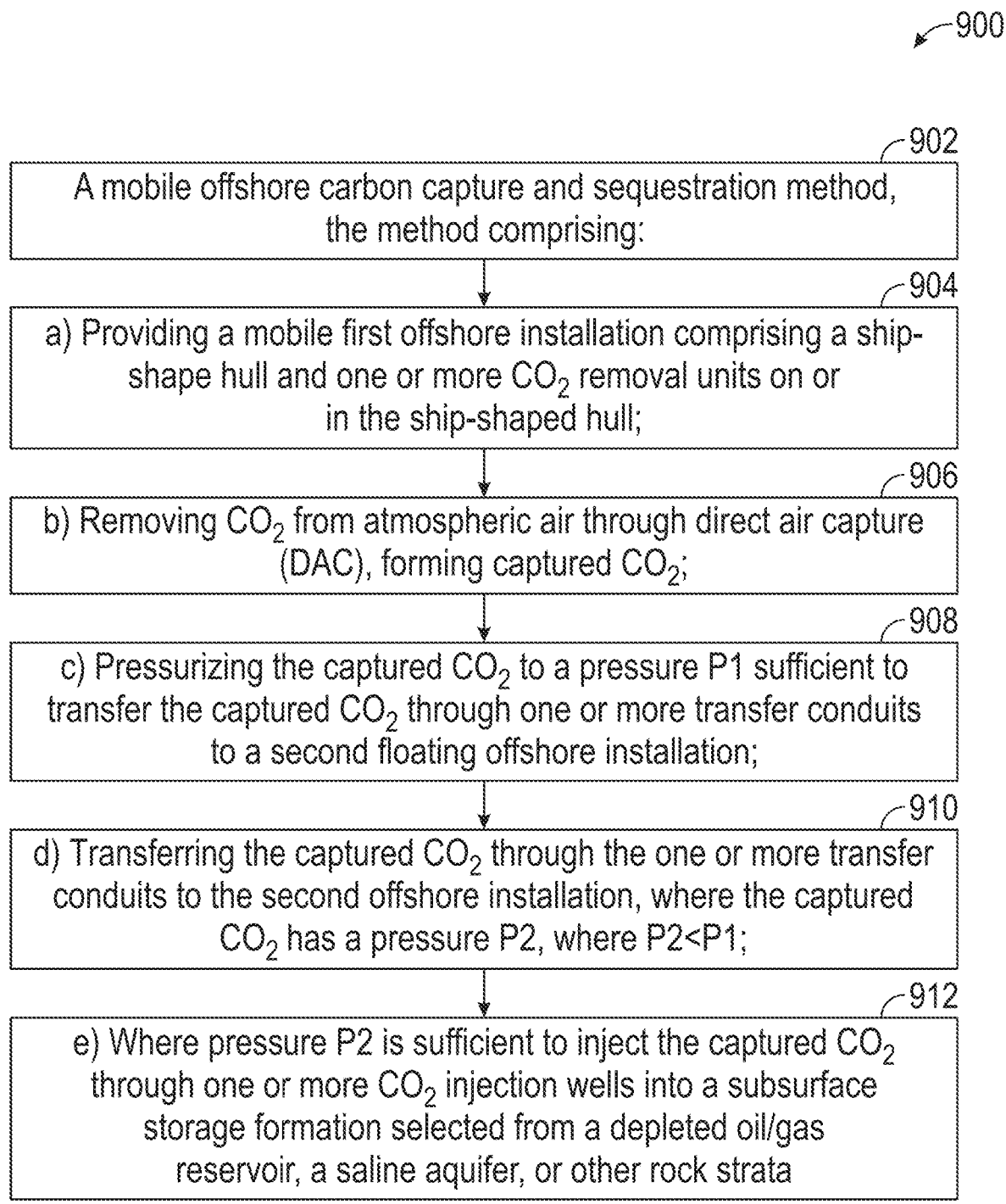

Method embodiment 900 illustrated schematically in FIG. 12 is a mobile offshore carbon capture and sequestration method (box 902), including the steps of a) providing a first offshore installation comprising a ship-shaped hull, the ship-shaped hull comprising one or more CO2 removal units thereon or therein (box 904); b) removing CO2 from atmospheric air through Direct Air Capture (DAC), forming captured CO2 (box 906); c) pressurizing the captured CO2 to a pressure P1 sufficient to transfer the captured CO2 through one or more transfer conduits to a second offshore installation (box 908); d) transferring the captured CO2 through the one or more transfer conduits to the second offshore installation, where the captured CO2 has a pressure P2, where P2<P1 (box 910); e) where pressure P2 is sufficient to inject the captured CO2 through one or more CO2 injection wells into a subsurface storage formation selected from a depleted oil/gas reservoir, a saline aquifer, or other rock strata (box 912).

Figure 13:
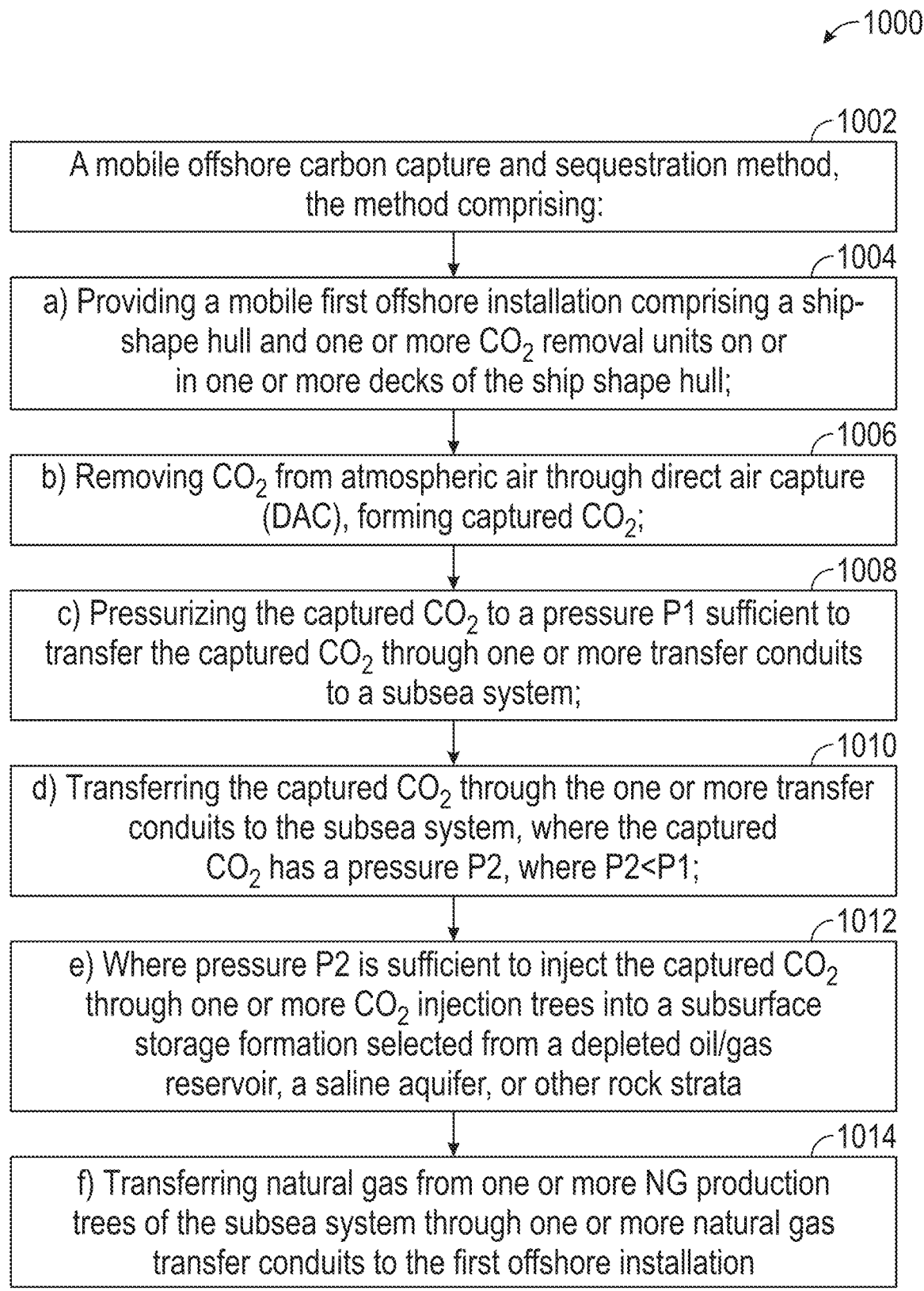

Method embodiment 1000 illustrated schematically in FIG. 13 is a mobile offshore carbon capture and sequestration method (box 1002), including the steps of a) providing a first offshore installation comprising a ship shape hull comprising one or more CO2 removal units on or in one or more decks of the ship shape hull (box 1004); b) removing CO2 from atmospheric air through Direct Air Capture (DAC), forming captured CO2 (box 1006); c) pressurizing the captured CO2 to a pressure P1 sufficient to transfer the captured CO2 through one or more transfer conduits to a subsea system (box 1008); d) transferring the captured CO2 through the one or more transfer conduits to the subsea system, where the captured CO2 has a pressure P2, where P2<P1 (box 1010); e) where pressure P2 is sufficient to inject the captured CO2 through one or more CO2 injection wells into a subsurface storage formation selected from a depleted oil/gas reservoir, a saline aquifer, or other rock strata (box 1012), and f) transferring natural gas from one or more NG production trees of the subsea system through one or more natural gas transfer conduits to the first offshore installation (box 1014).

Figure 14:
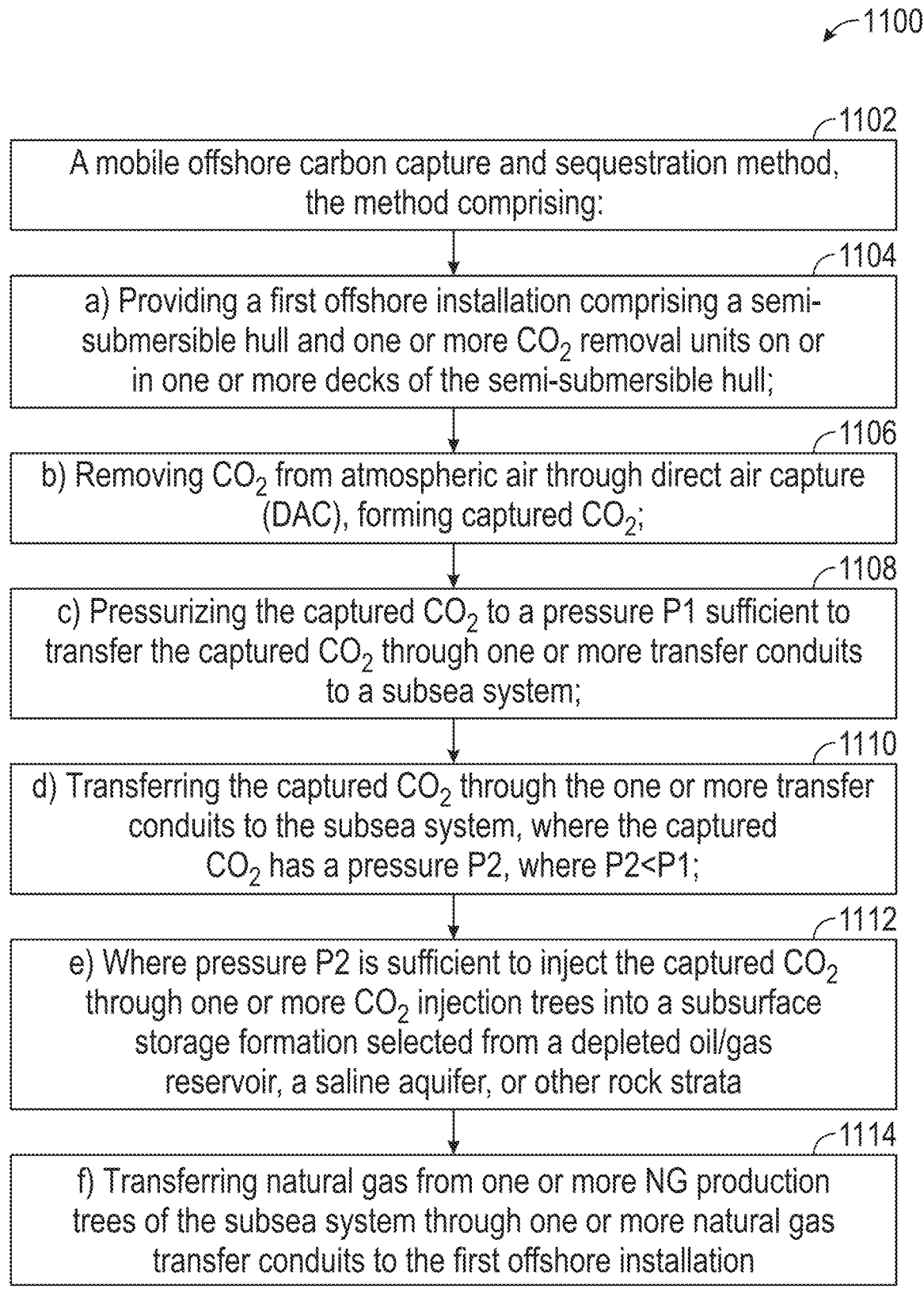

Method embodiment 1100 illustrated schematically in FIG. 14 is a mobile offshore carbon capture and sequestration method (box 1102), including the steps of a) providing a first offshore installation comprising a semi-submersible hull comprising one or more CO2 removal units on or in one or more decks of the semi-submersible hull (box 1104); b) removing CO2 from atmospheric air through Direct Air Capture (DAC), forming captured CO2 (box 1106); c) pressurizing the captured CO2 to a pressure P1 sufficient to transfer the captured CO2 through one or more transfer conduits to a subsea system (box 1108); d) transferring the captured CO2 through the one or more transfer conduits to the subsea system, where the captured CO2 has a pressure P2, where P2<P1 (box 1110); e) where pressure P2 is sufficient to inject the captured CO2 through one or more CO2 injection wells into a subsurface storage formation selected from a depleted oil/gas reservoir, a saline aquifer, or other rock strata (box 1112), and f) transferring natural gas from one or more NG production trees of the subsea system through one or more natural gas transfer conduits to the first offshore installation (box 1114).

Certain system embodiments may include some support equipment to enable further functionality. This support equipment may be similar to equipment designed for some other uses in the marine drilling and production industry. For example, certain systems and methods of the present disclosure may include reels (not illustrated) containing umbilical/control lines for one or more systems or sub-systems on the first and/or second installation. These reels may be installed around the moon pool (if present), if space is available, on deck 130 of the first installation. Alternatively, the reels may be installed on the sides of deck 130. In general, reels may be designed for enough tensile capacity and running capacity which allows for planning to retrieve and run back the equipment at any time during operations for service. Smaller pieces of equipment may be installed, such as hydraulic power supply, and/or electric main and backup power supply for control of various components. For this purpose, commonly available equipment may be used, provided its design allows for the intended use with the systems and methods of the present disclosure.

One benefit of systems and methods of the present disclosure is there is minimal to no modifications required to enable virtually any floatable structure to perform DAC and CO2 sequestration operations. Once the system is built, there will be minimal time to install on the floatable structure. The modular nature of the components reduces extensive planning, assessing location, interconnection, pipe routing, modification to existing pipe, deck loads, penetrations, etc. For non-modular systems it is not uncommon that the system design undergoes several iterations and modifications as result of design and engineering maturation and risk assessment. Once the planning is completed, fabrication and installation starts, which takes significant time. Critical path installation time is carefully minimized, however significant portions of the installation are required to be performed on critical path, resulting in costly downtime. After installation is completed, commissioning, approval and certification process require inspection of welds, pressure testing of the equipment and lines, and audits to validate the final installation as per planned. Only then, and after careful review of documentation, the class certification can be issued.

In contrast, the systems and methods of the present disclosure may be engineered to be self-contained in modular units. The systems may be transported to the floatable structure (semi-submersible, or ship-shaped hull), installed and run temporarily, without need for modification to the floatable structure's equipment, or interconnections with the floatable structure's other equipment. This represents significant cost and time savings. No additional class certification for the CO2 removal system is needed if the systems of the present disclosure are certified by competent bodies.

It will be understood by those skilled in this art that companies listed in the following discussion typically perform design, engineering, procurement, and construction management, while contracted shipyards perform fabrication and integration. Any known type of quick connect/quick disconnect (QC/QD) connector may be employed in practicing the systems and methods of the present disclosure. Suitable QC/QD connectors include those discussed in U.S. Pat. No. 5,645,106 and are currently commercially available from Maxbar Incorporated, Houston Texas (U.S.A.) under the trade designation 84 SERIES.

Any known type of flexible hose or flexible pipe may be employed in practicing the systems and methods of the present disclosure. Suitable examples include those currently commercially available from TechnipFMC, London, UK; NOV, Houston, Texas; and Baker Hughes, Houston, Texas. Suitable marine fluid transfer systems, such as hose reel systems and cantilever A-frame systems, include those currently commercially available from SafeRack, Andrews, South Carolina, and Palfinger Marine, Salzburg, Austria. These systems may comprise their own electro/hydraulic power unit, PLC control and monitoring systems, ICS interfaces, and/or foundation/deck loading analysis.

Any known type of mass flow meter may be employed in practicing the systems and methods of the present disclosure. Suitable mass flow meters and components typically used therewith include the coriolis flow and density meters currently commercially available from Emerson (under the trade designation ELITE Peak Performance Coriolis Flow and Density Meter) and other suppliers.

Any known type of pressure relief component (Pressure Relief Valve (PRV), or other) may be employed in practicing the systems and processes of the present disclosure. Suitable pressure relief components include those currently commercially available from Expro, London (U.K.) under the trade designation PRV MAX. Any known type of pressure control device may be employed in practicing the systems and processes of the present disclosure, including systems known under the trade designation POWERCHOKES, commercially available form Expro, London, (U.K.). Suitable chokes include those available from Expro, London (U.K.) under the trade designation POWERCHOKES.

Any known type of compressor may be employed in practicing the systems and methods of the present disclosure. Suitable compressors include centrifugal compressors available from Atlas Copco, Stockholm, Sweden; reciprocating, internally geared, and single shaft centrifugal compressors available from Siemens Energy, Munich, Germany; and reciprocating, turbo, and screw compressors available from MAN Energy Solutions, Houston, Texas.

Any known type of fan or blower (air movers) may be employed in practicing the systems and methods of the present disclosure. Suitable fans and blowers include those available from Chart Industries, Ball Ground, Georgia; and those available from Croft Systems, Needville, Texas, under the trade designation SPECIALTY SERIES.

Any known type of CO2 dehydrator may be employed in practicing the systems and methods of the present disclosure. Suitable dehydrators include those available from Axens, Rueil-Malmaison Ile-de-France (absorption drying equipment that utilizes liquid triethylene glycol (TEG) or other as its dehydrating agent to remove water from a hydrocarbon vapor stream flowing over it; or proprietary adsorbent solutions); and NOV, Houston, Texas (TEG systems, molecular sieve systems utilizing temperature swing adsorption (TSA) systems, and TSA systems that utilize the aluminosilicate gel adsorbent known under the trade designation SORBEAD, from BASF).

Suitable DAC CO2 removal units include those currently commercially available from Climeworks Zurich, Switzerland. Some or all of these commercially available DAC CO2 removal units may be described in U.S. Pat. Nos. 11,420,149; 10,232,305; 11,612,879; 10,807,042; 11,285,425; 11,007,470; 10,279,306; 9,751,039; 11,712,652; 10,427,086, and other patents. Materials for use in such units may be described in U.S. Published patents application Nos. 20230233985 and 20230256377. The '985 document describes solid inorganic or organic, non-polymeric or polymeric support material functionalized on the surface with amino functionalities capable of reversibly binding carbon dioxide, with a specific BET surface area, preferably measured by nitrogen adsorption, in the range of 1-20 $m^2/g$.

Suitable post-combustion CO2 removal systems include those currently commercially available from NOV, Houston, Texas (based on amine CO2 absorption/desorption technology); Babcock & Wilcox, Akron, Ohio, under the trade designation SOLVEBRIGHT (based on amine CO2 absorption/desorption technology); cryogenic CO2 removal systems from Chart Industries, Ball Ground, Georgia; and Mitsubishi Heavy Industries, Chiyoda, Japan (based on amine CO2 absorption/desorption technology).

Suitable vertical wind turbines for use in systems and methods of the present disclosure include those commercially available from Sea Twirl, Gothenburg, Sweden, for example their 1 MW Model 52x Vertical Shafted turbines.

Suitable hydroturbines and wave energy systems for use in systems and methods of the present disclosure include those commercially available from Orbital Marine Power Ltd., Orkney, UK, including their Orbital O2 2 MW units.

Suitable gas turbine generators for use in systems and methods of the present disclosure include various models commercially available from GE, New York, New York; Rolls Royce, London, England; and Solar Turbines, San Diego, California.

Suitable diesel generators for use in systems and methods of the present disclosure include various models commercially available from NOV, Houston, Texas; CAT Offshore & Marine, Irving, Texas; and MAN Energy Solutions, Houston, Texas.

Suitable ship shape hulls for use in systems and methods of the present disclosure include those commercially available from MODEC, Tokyo, Japan, and B&W Offshore, Oslo, Norway, both of which produce custom designs. Suitable semisubmersible hulls for use in systems and methods of the present disclosure include those commercially available from Transocean, Vernier, Switzerland; Diamond Offshore Drilling, Houston, Texas; and Nabors Industries, Houston, Texas, all built to customer specifications.

Suitable control systems, which would be custom-built for use in systems and methods of the present disclosure include those commercially available from Emerson, St Louis, Missouri; Honeywell, Charlotte, North Carolina; and Yokogawa, Masashino, Japan.

Suitable living quarters for use in systems and methods of the present disclosure include those custom-built and available from Leirvik, Leirvik, Stord, Norway, and modular and custom-built units available from STACO Shinhwa, Gyeongsangnam-do, Korea.

Any known type of transfer buoy may be used in practicing the systems and methods of this disclosure. Suitable examples include those currently commercially available from SBM Offshore, Schiphol, Netherlands; Sofec (part of Modec), Houston, Texas; and Bluewater Energy Services, L5 Hoofddorp, Netherlands, all of which supply custom made equipment depending on the application.

During operation, one or all of T, P, mass flow rate, gas or vapor concentrations (or percentages of set point values) may be displayed locally on Human Machine Interface (HMI), such as a laptop computer having display screen having a graphical user interface (GUI), or handheld device, or similar. In certain embodiments the HMI may record and/or transmit the data via wired or wireless communication to another HMI, such as a laptop, desktop, or hand-held computer or display. These communication links may be wired or wireless.

Any known type of riser and riser joints may be employed in practicing the systems and processes of the present disclosure. Suitable risers and riser joints and components typically used therewith include the marine risers described in U.S. Pat. Nos. 4,234,047; 4,646,840; 4,762,180; 6,082,391; and 6,321,844, Concentric offset risers are discussed in Szucs et al., "*Heavy Oil Gas Lift Using the COR*", Soc. of Petroleum Engrs. (SPE) 97749 (2005), American Petroleum Institute (API) Recommended Practice 2RD, (API-RP-2RD), First Edition, June 1998), "*Design of Risers for Floating Production Systems (FPSs) and Tension-Leg Platforms (TLPs)*" is a standard in the subsea oil and gas production industry. Concentric risers are discussed in *Subsea Engineering Handbook*, page 437, (published December 2010).

One or more control strategies may be employed, as long as the strategy includes measurement of CO2 pressures P1, P2, and optionally P3, and those measurements (or values derived from those measurements) are used in controlling the systems and/or methods described herein. A pressure process control scheme may be employed, for example in conjunction with the CO2 compressor, pressure control devices, and mass flow controllers. A master controller may be employed, but the disclosure is not so limited, as any combination of controllers could be used. Programmable logic controllers (PLCs) may be used.

Components described herein may be built to meet ISO standards, Det Norske Veritas (DNV) standards, American Bureau of Standards (ABS) standards, American Petroleum Institute (API) standards, and/or other recognized standards.

The electrical connections, if used (voltage and amperage) will be appropriate for the zone rating desired of the system. In certain embodiments one or more electrical cables may be run and connected to an identified power supply at the work site to operate the HMI, CO2 removal system, and other components. Certain embodiments may employ a dedicated power supply. The identified or dedicated power supply may be controlled by one or more logic devices so that it may be shut down. In exemplary embodiments, systems of the present disclosure may have an electrical isolation (lockout) device on a secure cabinet.

In embodiments where connection to one or more remote HMI units is desired, this may be achieved by an intrinsically safe cable and connection so as to allow system components to operate in the required zoned area. If no remote access is required, power to operate the HMI, CO2 removal system, and other components may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) processes). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

In certain embodiments, internal algorithms in the logic device, such as a PLC, may calculate a rate of increase or decrease in pressure inside equipment or transfer conduits. This may then be displayed or audioed in a series of ways such as "percentage to shutdown" lights or sounds, and the like on one or more GUIs. In certain embodiments, an additional function within a HMI may be to audibly alarm when the calculated pressure rate of increase or decrease reaches a level set by the operator. In certain embodiments this alarm may be sounded inside the control room on the first installation (if present), outside the control room, as well as remote from the first or second installations, for example in a remote control room.

Systems, transfer conduits, cabinets therefore, logic devices, sensors, valves, and optional safety shutdown units should be capable of withstanding long term exposure to probable liquids and vapors, including carbon dioxide ($CO_2$), hydrocarbons, acids, acid gases, fluids (oil-based and water-based), solvents, brine, anti-freeze compositions, hydrate inhibition chemicals, and the like, typically encountered in offshore and subsea processing facilities.

What has not been recognized or realized are systems and methods for mobile offshore carbon capture and sequestration that are robust and safe. Systems and methods to accomplish this without significant risk to workers and property is highly desirable. As explained previously, systems and processes exist, but they are not necessarily economical and involve interconnection with existing deck equipment. The present inventor, however, personally knows of the inefficiencies of such practices.

In alternative embodiments, the components need not be rectangular, as illustrated in the drawings, but rather the $CO_2$ removal system could take any shape, such as a box or cube shape, elliptical, triangular, prism-shaped, hemispherical or semi-hemispherical-shaped (dome-shaped), or combination thereof and the like, as long as the pressure sensors, safety shutdown system, logic devices, and the like have suitable fittings to connect (either via wired or wireless communication) to a power source. It will be understood that such embodiments are part of this disclosure and deemed within the claims. Furthermore, one or more of the various components may be ornamented with various informational and/or safety ornamentation produced in various ways (for example stamping or engraving, or raised features such as reflectors, reflective tape, patterns of threaded round-head screws or bolts screwed into holes in the $CO_2$ removal system), such as facility designs, operating company designs, logos, letters, words, nicknames (for example MOCCASU, and the like). Some components may include optional hand-holds, which may be machined or formed to have easy-to-grasp features for fingers or may have rubber grips shaped and adorned with functional and/or safety features, such as raised knobby gripper patterns.

Thus the systems and methods described herein provide afford ways to perform mobile offshore carbon capture and sequestration operations safely and economically, and with significantly reduced risk of injury and discomfort to surface workers and damage to property, facilities, and the vessel.

From the foregoing detailed description of specific embodiments, it should be apparent that patentable systems, combinations, and methods have been described. Although specific embodiments of the disclosure have been described herein in some detail, this has been done solely for the purposes of describing various features and aspects of the systems and methods and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to take an existing non-semi-submersible structure and modify it to include features of a semi-submersible structure and other components and connections mentioned herein to allow performance of the methods of this disclosure. Some systems of this disclosure may be devoid of certain components and/or features: for example, systems devoid of a dehydrator; systems devoid of low-strength steels; systems devoid of threaded fittings; systems devoid of welded fittings; semi-submersible structures devoid of cross-beam structural supports.

What is claimed is:

1. A system comprising:
    a) a first offshore installation comprising
        i) a floatable hull, the floatable hull anchored to a seabed using a mooring system, the floatable hull selected from the group consisting of semi-submersible hulls and ship-shape hull forms, the floatable hull integrates one or more renewable energy systems and equipment to produce electricity and power, the one or more renewable energy systems comprising one or more hydroturbines configured to be lowered into the water when in operation or raised above the water line during relocation, and
        ii) a carbon dioxide ($CO_2$) removal system comprising one or more $CO_2$ removal units on or in the floatable hull, one or more $CO_2$ dehydration units, and one or more compressors, the one or more $CO_2$ removal units configured to remove $CO_2$ from atmospheric air through Direct Air Capture (DAC) and form captured compressed $CO_2$;
    b) one or more $CO_2$ transfer conduits fluidly connecting the $CO_2$ removal system with a second offshore installation or a subsea system;
    c) the one or more compressors configured to transfer the captured compressed $CO_2$ through the one or more transfer conduits to the second offshore installation or to the subsea system; and
    d) the second offshore installation or the subsea system comprising one or more $CO_2$ injection conduits and wells configured to inject the captured compressed $CO_2$ into a subsurface storage formation selected from a depleted oil/gas reservoir, a saline aquifer, or other rock strata.

2. The system of claim 1 wherein the floatable hull is a semi-submersible hull.

3. The system of claim 1 wherein the floatable hull is a ship-shape hull form selected from floating production storage and offloading ships.

4. The system of claim 1 wherein the $CO_2$ removal unit is integrated into the floatable hull.

5. The system of claim 1 wherein the floatable hull comprises a propulsion system integrated into the hull.

6. The system of claim 1 wherein the one or more renewable energy systems comprises one or more vertical wind turbines integrated into the floatable hull, and wave energy systems attached to the floatable hull.

7. The system of claim 1 wherein the $CO_2$ removal system comprises:

a) an air intake and transport system configured to move the atmospheric air into the one or more CO2 removal units comprising one or more fans or other equipment used to intake, transport and/or compress air,
b) a dehydration system to remove water from the captured CO2 and form dehydrated CO2,
c) the one or more compressors are configured to compress the dehydrated CO2, and
d) a manifold connecting the one or more compressors to the one or more CO2 transfer conduits.

8. The system of claim 1 comprising one or more power generation equipment selected from gas turbines generators (GTGs), diesel engine driven generators and renewable power generation.

9. The system of claim 1 comprising one or more fuel reception systems configured to accept natural gas from the second offshore installation to use as fuel for generating power.

10. The system of claim 9 wherein the one or more fuel reception systems is further configured to accept natural gas (NG), hydrogen (H2), or a NG/H2 mixture from any source (e.g. offshore pipeline, onshore to offshore pipeline, storage vessel), to use as fuel for generating power.

11. The system of claim 1 wherein the first offshore installation comprises electrical equipment to receive electrical power from an independent renewable energy power source selected from one or more seafloor mounted hydro-turbines, one or more standalone wind turbines (floating and/or attached to the seafloor) or the power grid that connects various turbines in an offshore wind development.

12. The system of claim 1 wherein the first offshore installation comprises electrical equipment to receive electrical power from the second installation or other electrical power source, not necessarily renewable electrical power.

13. A system comprising:
a) a first offshore installation comprising
  i) a floatable hull, the floatable hull anchored to a seabed using a mooring system, the floatable hull selected from the group consisting of semi-submersible hulls and ship-shape hull forms, and
  ii) a carbon dioxide (CO2) removal system comprising one or more CO2 removal units on or in the floatable hull, one or more CO2 dehydration units, and one or more compressors, the one or more CO2 removal units configured to remove CO2 from atmospheric air through Direct Air Capture (DAC) and form captured compressed CO2;
b) one or more CO2 transfer conduits fluidly connecting the CO2 removal system with a second offshore installation or a subsea system;
c) the one or more compressors configured to transfer the captured compressed CO2 through the one or more transfer conduits to the second offshore installation or to the subsea system; and
d) the second offshore installation or the subsea system comprising one or more CO2 injection conduits and wells configured to inject the captured compressed CO2 into a subsurface storage formation selected from a depleted oil/gas reservoir, a saline aquifer, or other rock strata; and
e) the one or more CO2 removal units are modular and configured to be removed, replaced, or upgraded and disconnected from and connected to decking of the floatable hull.

14. A system comprising:
a) a first offshore installation comprising
  i) a floatable hull, the floatable hull anchored to a seabed using a mooring system, the floatable hull selected from the group consisting of semi-submersible hulls and ship-shape hull forms, and
  ii) a carbon dioxide (CO2) removal system comprising one or more CO2 removal units on or in the floatable hull, one or more CO2 dehydration units, and one or more compressors, the one or more CO2 removal units configured to remove CO2 from atmospheric air through Direct Air Capture (DAC) and form captured compressed CO2;
b) one or more CO2 transfer conduits fluidly connecting the CO2 removal system with a second offshore installation or a subsea system;
c) the one or more compressors configured to transfer the captured compressed CO2 through the one or more transfer conduits to the second offshore installation or to the subsea system; and
d) the second offshore installation or the subsea system comprising one or more CO2 injection conduits and wells configured to inject the captured compressed CO2 into a subsurface storage formation selected from a depleted oil/gas reservoir, a saline aquifer, or other rock strata;
e) the second installation is a spar, TLP, or FPSO comprising one or more natural gas production wells and one or more CO2 injection wells,
f) the one or more transfer conduits comprise risers and flowline segments configured to fluidly connect the first installation with the second installation,
g) one of the one or more transfer conduits being a CO2 transfer riser and flowline segment, a second one of the one or more transfer conduits being a natural gas transfer riser and flowline segment, the CO2 transfer conduit fluidly connecting the CO2 removal system with a CO2 injection riser and well on the spar, and the natural gas transfer riser fluidly connecting a natural gas production riser and well on the spar with the first installation.

15. The system of claim 14 wherein a flowline portion of the CO2 transfer conduit and/or a flowline portion of the natural gas transfer conduit are configured to rest on a seabed.

16. The system of claim 14 wherein at least one of the CO2 transfer conduits and the natural gas transfer conduits are supported by buoyancy modules.

17. The system of claim 14 wherein
the CO2 transfer conduit comprises a first portion and a second portion;
the first portion fluidly connecting the CO2 removal system with a transfer buoy, and the second portion fluidly connecting the transfer buoy with the CO2 injection riser and well;
the natural gas transfer conduit comprises a third portion and a fourth portion;
the third portion fluidly connecting the natural gas production tree and riser with the transfer buoy, and the fourth portion fluidly connecting the transfer buoy with the first installation.

* * * * *